(12) United States Patent
Benjey et al.

(10) Patent No.: US 9,751,411 B2
(45) Date of Patent: Sep. 5, 2017

(54) VARIABLE SPEED HYBRID ELECTRIC SUPERCHARGER ASSEMBLY AND METHOD OF CONTROL OF VEHICLE HAVING SAME

(71) Applicant: EATON CORPORATION, Cleveland, OH (US)

(72) Inventors: Robert P. Benjey, Dexter, MI (US); William N. Eybergen, Macomb County, MI (US); Vasilios Tsourapas, Northville, MI (US); Martin D. Pryor, Canton, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/388,497

(22) PCT Filed: Mar. 13, 2013

(86) PCT No.: PCT/US2013/030944
§ 371 (c)(1),
(2) Date: Sep. 26, 2014

(87) PCT Pub. No.: WO2013/148205
PCT Pub. Date: Oct. 3, 2013

(65) Prior Publication Data
US 2015/0047617 A1    Feb. 19, 2015

Related U.S. Application Data

(60) Provisional application No. 61/617,152, filed on Mar. 29, 2012.

(51) Int. Cl.
*F02B 33/44*    (2006.01)
*F02B 33/00*    (2006.01)
(Continued)

(52) U.S. Cl.
CPC .......... *B60L 11/1809* (2013.01); *B60K 6/485* (2013.01); *B60L 11/1851* (2013.01);
(Continued)

(58) Field of Classification Search
CPC .......... F02B 33/34; F02B 33/40; F02B 33/38; B60L 11/1809; B60L 11/1851;
(Continued)

(56) References Cited

U.S. PATENT DOCUMENTS 1,752,224 A    3/1930   Apple
1,878,210 A *  9/1932   Vincent ................... F02B 39/12
                                                        123/559.3
(Continued)

FOREIGN PATENT DOCUMENTS

CN          1982670 A       6/2007
CN        101326068 A      12/2008
(Continued)

OTHER PUBLICATIONS

Machine Translation copy of a prior art to Ishikawajima Harima Heavy Industries (JP 05-042645 U), Published on Jun. 11, 1993.*
(Continued)

*Primary Examiner* — Thai Ba Trieu
(74) *Attorney, Agent, or Firm* — Merchant & Gould P.C.

(57) ABSTRACT

A supercharger assembly includes a supercharger in series with an engine that has a crankshaft and has an air intake manifold defining a plenum through which air flow is provided to the engine. A supercharger is upstream of the plenum in air flow to the engine and has a first rotor rotatable with a first shaft and a second rotor rotatable with a second shaft. The supercharger assembly also includes an electric motor-generator that is selectively alternately operable as a motor and as a generator, and a planetary gearing arrangement having a first member operatively connected to the (Continued)

electric motor-generator, a second member connectable to be rotated by the engine crankshaft, and a third member operatively connected for rotation with the first shaft. The supercharger assembly has only two selectively engageable torque-transmitting mechanisms and a control system configured to control the electric motor-generator and the torque-transmitting mechanisms.

21 Claims, 19 Drawing Sheets

(51) Int. Cl.
    *B60L 11/18*     (2006.01)
    *B60K 6/485*     (2007.10)
    *F02B 33/34*     (2006.01)
    *F02B 33/40*     (2006.01)
    *F02D 23/00*     (2006.01)
    *F02B 33/38*     (2006.01)
    *B60K 6/48*     (2007.10)

(52) U.S. Cl.
    CPC .............. *F02B 33/34* (2013.01); *F02B 33/38* (2013.01); *F02B 33/40* (2013.01); *F02D 23/005* (2013.01); *B60K 2006/4825* (2013.01); *B60Y 2400/435* (2013.01); *F02M 2700/335* (2013.01); *Y02T 10/6226* (2013.01); *Y02T 10/6252* (2013.01); *Y10S 903/903* (2013.01)

(58) Field of Classification Search
    CPC ............ B60K 6/485; B60K 2006/4825; F02D 23/005; F02M 2700/335; B60Y 2400/4825; Y02T 10/6226; Y02T 10/6252; Y10S 903/903
    USPC ............ 60/607–609; 123/559.1–559.3, 561; 903/903; 180/53.8; 475/287; 477/3–6
    See application file for complete search history.

(56) References Cited

U.S. PATENT DOCUMENTS

| | | | |
|---|---|---|---|
| 2,358,815 A | 9/1944 | Lysholm | |
| 2,390,487 A | 12/1945 | Lawrence et al. | |
| 2,400,306 A | 5/1946 | Hobbs | |
| 2,402,547 A | 6/1946 | Gilfillan | |
| 2,441,779 A | 5/1948 | Troeger et al. | |
| 2,467,077 A | 4/1949 | Brunken | |
| 2,965,083 A | 12/1960 | Percival | |
| 2,975,963 A | 3/1961 | Nilsson | |
| 3,180,079 A | 4/1965 | Freeman, Jr. | |
| 3,184,155 A | 5/1965 | Crooks | |
| 3,391,584 A * | 7/1968 | Glamann | B60K 17/04 475/113 |
| 3,430,517 A * | 3/1969 | Glamann | F16H 47/08 475/113 |
| 3,603,853 A | 9/1971 | Mackay | |
| 3,676,999 A | 7/1972 | Oldfield | |
| 3,741,676 A | 6/1973 | Silvern et al. | |
| 3,804,565 A | 4/1974 | Sennet et al. | |
| 3,868,822 A | 3/1975 | Keller | |
| 3,958,419 A | 5/1976 | Laing | |
| 3,976,390 A | 8/1976 | Silvern et al. | |
| 4,068,984 A | 1/1978 | Spindler | |
| 4,083,188 A | 4/1978 | Kumm | |
| 4,478,043 A | 10/1984 | Kobavashi et al. | |
| 4,485,310 A * | 11/1984 | de Valroger | F02B 39/10 60/607 |
| 4,489,242 A * | 12/1984 | Worst | B60L 1/00 123/142.5 E |
| 4,729,225 A | 3/1988 | Bucher | |
| 4,730,457 A * | 3/1988 | Yamada | F02B 39/12 60/609 |
| 4,825,839 A | 5/1989 | Mehnert | |
| 5,115,788 A * | 5/1992 | Sasaki | F02B 33/36 123/559.3 |
| 5,121,607 A | 6/1992 | George, Jr. | |
| 5,125,806 A | 6/1992 | Quick et al. | |
| 5,158,427 A | 10/1992 | Shirai | |
| 5,195,881 A | 3/1993 | George, Jr. | |
| 5,241,817 A | 9/1993 | George, Jr. | |
| 5,263,832 A | 11/1993 | Yamaguchi | |
| 5,394,848 A | 3/1995 | Tsutsumi et al. | |
| 5,442,918 A | 8/1995 | Baeuerle et al. | |
| 5,713,204 A | 2/1998 | Kadlicko | |
| 5,791,315 A * | 8/1998 | Riach | F02B 33/36 123/564 |
| 5,875,766 A | 3/1999 | Ozawa | |
| 5,887,434 A | 3/1999 | Arnell et al. | |
| 5,890,468 A | 4/1999 | Ozawa | |
| 5,910,001 A * | 6/1999 | Takahashi | F01C 21/102 29/888.023 |
| 6,048,288 A * | 4/2000 | Tsujii | F02B 29/0462 477/5 |
| 6,537,169 B1 | 3/2003 | Morii | |
| 6,631,702 B2 | 10/2003 | Tonnqvist et al. | |
| 6,637,203 B2 | 10/2003 | Berglund | |
| 6,666,194 B2 | 12/2003 | Wildner | |
| 6,684,863 B2 | 2/2004 | Dixon et al. | |
| 6,817,349 B2 | 11/2004 | Awasaka et al. | |
| 6,845,832 B2 | 1/2005 | Takizawa et al. | |
| 6,863,139 B2 | 3/2005 | Egami et al. | |
| 6,907,867 B2 | 6/2005 | Igarashi et al. | |
| 6,918,250 B2 | 7/2005 | Baeuerle | |
| 6,922,995 B2 | 8/2005 | Kawamura et al. | |
| 6,938,419 B2 | 9/2005 | Okuyama et al. | |
| 7,000,601 B2 | 2/2006 | Yasui et al. | |
| 7,102,304 B2 | 9/2006 | Sebille et al. | |
| 7,524,263 B2 | 4/2009 | Johnson et al. | |
| 7,708,283 B2 | 5/2010 | Azibert et al. | |
| 7,748,366 B2 | 7/2010 | Rollinger et al. | |
| 7,765,806 B2 | 8/2010 | Clark | |
| 7,805,937 B2 | 10/2010 | Cochet et al. | |
| 8,087,401 B2 | 1/2012 | Inoue et al. | |
| 8,151,773 B2 | 4/2012 | Prior | |
| 8,196,686 B2 | 6/2012 | Grieve | |
| 8,808,124 B2 * | 8/2014 | Major | B60K 6/48 180/65.265 |
| 9,074,524 B2 * | 7/2015 | Eybergen | F02B 39/10 60/608 |
| 9,534,531 B2 | 1/2017 | Benjey et al. | |
| 9,534,532 B2 | 1/2017 | Eybergen et al. | |
| 2004/0178636 A1 * | 9/2004 | Iwanami | B60H 1/3222 290/40 C |
| 2004/0237949 A1 | 12/2004 | Yasui et al. | |
| 2006/0157036 A1 * | 7/2006 | Andersen | F02B 33/38 123/563 |
| 2007/0051349 A1 | 3/2007 | Marumoto et al. | |
| 2007/0074701 A1 * | 4/2007 | Mizutani | F02D 11/105 123/198 D |
| 2007/0137626 A1 * | 6/2007 | Turner | F02B 39/10 123/559.1 |
| 2008/0041323 A1 | 2/2008 | Clark | |
| 2008/0087482 A1 | 4/2008 | Ledger et al. | |
| 2008/0173017 A1 | 7/2008 | St. James | |
| 2008/0194375 A1 * | 8/2008 | Voigt | F16H 3/54 475/296 |
| 2008/0289610 A1 | 11/2008 | Nguyen-Schaefer et al. | |
| 2008/0312803 A1 | 12/2008 | Igarashi et al. | |
| 2009/0038585 A1 | 2/2009 | Andri | |
| 2009/0048745 A1 | 2/2009 | Wu et al. | |
| 2009/0222188 A1 | 9/2009 | Igarashi | |
| 2009/0277215 A1 | 11/2009 | Tsuboi | |
| 2009/0288648 A1 | 11/2009 | Prior et al. | |
| 2009/0291803 A1 | 11/2009 | Moeller | |
| 2010/0050998 A1 | 3/2010 | Ai et al. | |
| 2010/0071673 A1 | 3/2010 | Prior | |
| 2010/0155157 A1 | 6/2010 | Grieve | |
| 2010/0263375 A1 | 10/2010 | Grieve | |
| 2010/0275890 A1 | 11/2010 | McDonald-Walker | |
| 2010/0314186 A1 | 12/2010 | Ma | |

(56) References Cited

U.S. PATENT DOCUMENTS

| | | | |
|---|---|---|---|
| 2011/0030641 A1 | 2/2011 | Wu et al. | |
| 2011/0067395 A1 | 3/2011 | Suhocki | |
| 2011/0083647 A1* | 4/2011 | Hansen | F01C 11/008 123/564 |
| 2011/0094480 A1 | 4/2011 | Suhocki et al. | |
| 2011/0204654 A1* | 8/2011 | Hansen | F02B 33/38 290/1 R |
| 2012/0041664 A1 | 2/2012 | Hansen et al. | |
| 2012/0156079 A1* | 6/2012 | Hirata | F04C 28/06 418/201.1 |
| 2013/0089413 A1 | 4/2013 | Fujimoto et al. | |
| 2013/0090832 A1 | 4/2013 | Bevan et al. | |
| 2013/0146035 A1* | 6/2013 | Eybergen | F02B 29/0475 123/562 |
| 2013/0255647 A1* | 10/2013 | Akashi | F02B 39/10 123/559.1 |
| 2014/0208745 A1 | 7/2014 | Suhocki et al. | |
| 2014/0224228 A1* | 8/2014 | Benjey | F02B 33/32 123/559.3 |
| 2014/0238361 A1 | 8/2014 | Tsourapas et al. | |
| 2014/0283797 A1 | 9/2014 | Eybergen et al. | |
| 2015/0066272 A1* | 3/2015 | Benjey | B60K 6/485 701/22 |
| 2015/0260187 A1 | 9/2015 | Endo et al. | |
| 2015/0330295 A1* | 11/2015 | Walls | F02B 67/06 475/5 |
| 2015/0377158 A1* | 12/2015 | Benjey | F02B 39/10 701/22 |
| 2016/0001649 A1* | 1/2016 | Benjey | F02B 39/10 477/5 |
| 2016/0237880 A1* | 8/2016 | Ouwenga | F02B 39/04 |
| 2016/0319733 A1* | 11/2016 | Benjey | F02B 39/16 |
| 2017/0009678 A1* | 1/2017 | Cloos | F02D 9/1065 |
| 2017/0059008 A1* | 3/2017 | Kashyap | F16H 3/54 |

FOREIGN PATENT DOCUMENTS

| | | | | |
|---|---|---|---|---|
| CN | 201159098 Y | | 12/2008 | |
| CN | 102072011 A | | 5/2011 | |
| CN | 202944330 U | | 5/2013 | |
| DE | 3205721 A1 | * | 8/1983 | F02B 39/12 |
| DE | 38 01 227 A1 | | 11/1988 | |
| DE | 39 33 409 A1 | | 4/1991 | |
| DE | 11 2005 00048 T5 | | 1/2007 | |
| DE | 102010054223 A1 | | 3/2012 | |
| EP | 0 222 989 A1 | | 5/1987 | |
| EP | 1 314 884 A2 | | 5/2003 | |
| EP | 1 462 629 A1 | | 9/2004 | |
| EP | 1 895 130 A1 | | 3/2008 | |
| GB | 476729 A | * | 12/1937 | F02B 39/04 |
| GB | 2 456 600 A | | 7/2009 | |
| JP | 60001328 A | * | 1/1985 | |
| JP | 60001329 A | * | 1/1985 | |
| JP | 60-075722 A | | 4/1985 | |
| JP | 61-004889 A | | 1/1986 | |
| JP | 61-159689 U | | 10/1986 | |
| JP | 62-101830 A | | 5/1987 | |
| JP | 2-24042 U | | 2/1990 | |
| JP | 02188625 A | * | 7/1990 | |
| JP | 3-179141 A | | 8/1991 | |
| JP | 3-225028 A | | 10/1991 | |
| JP | 5-42645 | | 6/1993 | |
| JP | 5-263649 A | | 10/1993 | |
| JP | 7-097939 A | | 4/1995 | |
| JP | 2000-230427 | | 8/2000 | |
| JP | 2001-073784 A | | 3/2001 | |
| JP | 2002-357127 | | 12/2002 | |
| JP | 2003-161156 A | | 6/2003 | |
| JP | 2004-308646 | | 11/2004 | |
| JP | 2005-042553 A | | 2/2005 | |
| JP | 2005-054612 A | | 3/2005 | |
| JP | 2005-188318 A | | 7/2005 | |
| JP | 2005-291020 A | | 10/2005 | |
| JP | 2006-083767 A | | 3/2006 | |
| JP | 2006-233803 A | | 9/2006 | |
| JP | 2006-258094 A | | 9/2006 | |
| JP | 2006-307648 A | | 11/2006 | |
| JP | 2007-016721 A | | 1/2007 | |
| JP | 2007-104855 A | | 4/2007 | |
| JP | 2007-192092 A | | 8/2007 | |
| JP | 2008-063974 A | | 3/2008 | |
| JP | 2008-215074 A | | 9/2008 | |
| JP | 2008-215075 A | | 9/2008 | |
| JP | 2009-243268 A | | 10/2009 | |
| JP | 2010-065656 A | | 3/2010 | |
| KR | 2005-0039187 A | | 4/2005 | |
| KR | 2007-0005461 A | | 1/2007 | |
| WO | WO 2004/072449 A1 | | 8/2004 | |
| WO | WO 2006/134330 A1 | | 12/2006 | |
| WO | WO 2008/020184 A1 | | 2/2008 | |
| WO | WO 2009/136994 A1 | | 11/2009 | |
| WO | WO 2013/049438 A2 | | 4/2013 | |
| WO | WO 2013/049439 A2 | | 4/2013 | |

OTHER PUBLICATIONS

Machine Translation copy of a prior art to Konaga Naoharu et al. (JP 2000-230427 A), Published on Aug. 22, 2000.*

Machine Translation copy of a prior art to Shibui Yasuyuki (JP 2002-357127 A), Published on Dec. 13, 2002.*

International Search Report for corresponding International Patent Application No. PCT/US2013/030944 mailed Aug. 21, 2013.

International Search Report for corresponding International Patent Application No. PCT/US2013/030954 mailed Dec. 3, 2013.

International Search Report for corresponding International Patent Application PCT/US2012/057702 dated Dec. 3, 2012.

International Search Report for corresponding International Patent Application No. PCT/US 2012/057706 dated Mar. 26, 2013.

International Search Report for corresponding International Patent Application No. PCT/US2012/057709 dated Mar. 26, 2013.

* cited by examiner

VARIABLE SPEED HYBRID ELECTRIC SUPERCHARGER ASSEMBLY AND METHOD OF CONTROL OF VEHICLE HAVING SAME

RELATED APPLICATIONS

This application is is a National Stage Application of PCT/US 2013/030944, filed 13 Mar. 2013, which claims benefit of U.S. Patent Application Ser. No. 61/617,152 filed on 29 Mar. 2012, and which applications are incorporated herein by reference. To the extent appropriate, a claim of priority is made to each of the above disclosed applications.

TECHNICAL FIELD

The present teachings generally include a supercharger assembly that includes a supercharger, an electric motor-generator, and a planetary gearing arrangement.

BACKGROUND

Energy efficient engines of reduced size are desirable for fuel economy and cost reduction. Smaller engines provide less torque than larger engines. A supercharger is sometimes used to increase the torque available from an engine. At low engine speeds, when higher torque is often requested by a vehicle operator by depressing the accelerator pedal, the supercharger provides additional air to the engine intake manifold, boosting air pressure and thereby allowing the engine to generate greater torque at lower engine speeds.

SUMMARY

The present teachings generally include a supercharger assembly for an engine. The engine has a crankshaft and an air intake manifold defining a plenum through which air flow is provided to the engine. The supercharger assembly includes a supercharger upstream of the plenum in the air flow to the engine. The supercharger has a first rotor mounted on and rotatable with a first shaft and a second rotor meshing with the first rotor and mounted on and rotatable with a second shaft via rotation of the first shaft. The supercharger assembly also includes an electric motor-generator that is selectively alternately operable as a motor and as a generator, and planetary gearing arrangement. A first member of the planetary gear set is operatively connected to be rotated by the electric motor-generator, a second member of the planetary gear set is connectable to be rotated by the engine crankshaft, and a third member of the planetary gear set is operatively connected for rotation with the first shaft. The supercharger assembly has only two selectively engageable torque-transmitting mechanisms including a clutch selectively engageable to operatively connect the second member for rotation with the engine crankshaft, and a brake selectively engageable to hold the first shaft stationary. A control system is configured to control the electric motor-generator, the brake and the clutch to achieve different operating modes. For example, if the engine is an internal combustion engine with a throttle valve, the throttle valve and the supercharger can be controlled so that throttling losses (i.e., the pressure drop that occurs across the throttle due to the vacuum created by the reciprocating engine cylinders) are selectively distributed across the throttle and/or the supercharger. The pressure drop placed across the supercharger can create torque that is converted to stored energy.

The above features and advantages and other features and advantages of the present teachings are readily apparent from the following detailed description of the best modes for carrying out the present teachings when taken in connection with the accompanying drawings.

DETAILED DESCRIPTION

Figure 1:
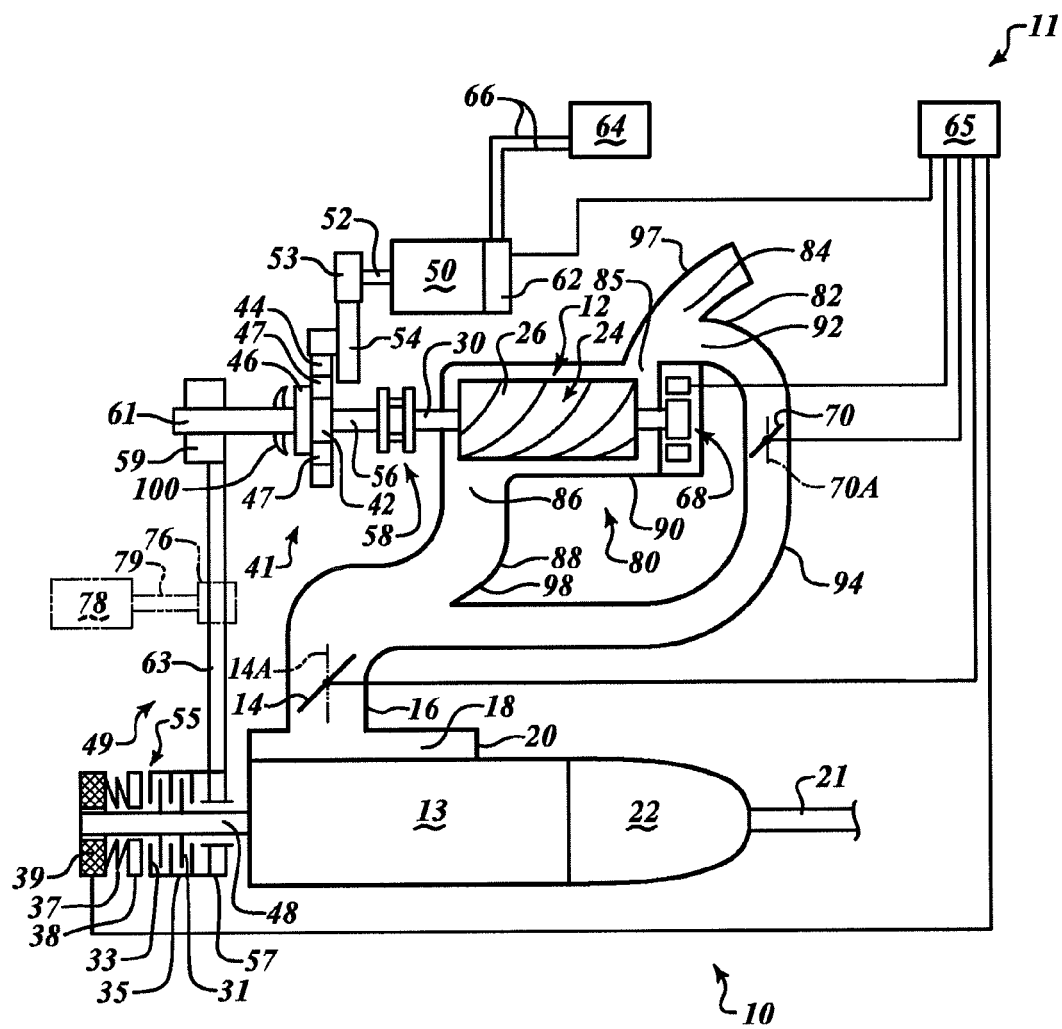
FIG. 1 is a schematic illustration in side view of a supercharger assembly and an engine assembly, with a housing assembly of the supercharger assembly partially removed, in accordance with an aspect of the present teachings.

Referring to the drawings, wherein like reference numbers refer to like components throughout the several views, FIG. 1 shows an engine assembly 10 that includes a supercharger assembly 11 with a supercharger 12 placed in series with a throttle valve, also referred to herein as a throttle 14, positioned in a throttle body 16 of an engine 13. The throttle body 16 is in the air flow to the engine 13 upstream of a plenum 18 in an air intake manifold 20. Although the supercharger 12 is shown upstream of the throttle 14 in air flow to the engine 13, the supercharger 12 could instead be downstream of the throttle 14 in air flow to the engine 13. That is, the throttle 14 could feed into an inlet 84 of the supercharger 12, and an outlet of the supercharger 12 could flow directly to the plenum 18. It should be appreciated that the supercharger 12 could also be used with an engine that does not have a throttle, such as a diesel engine.

Figure 3:
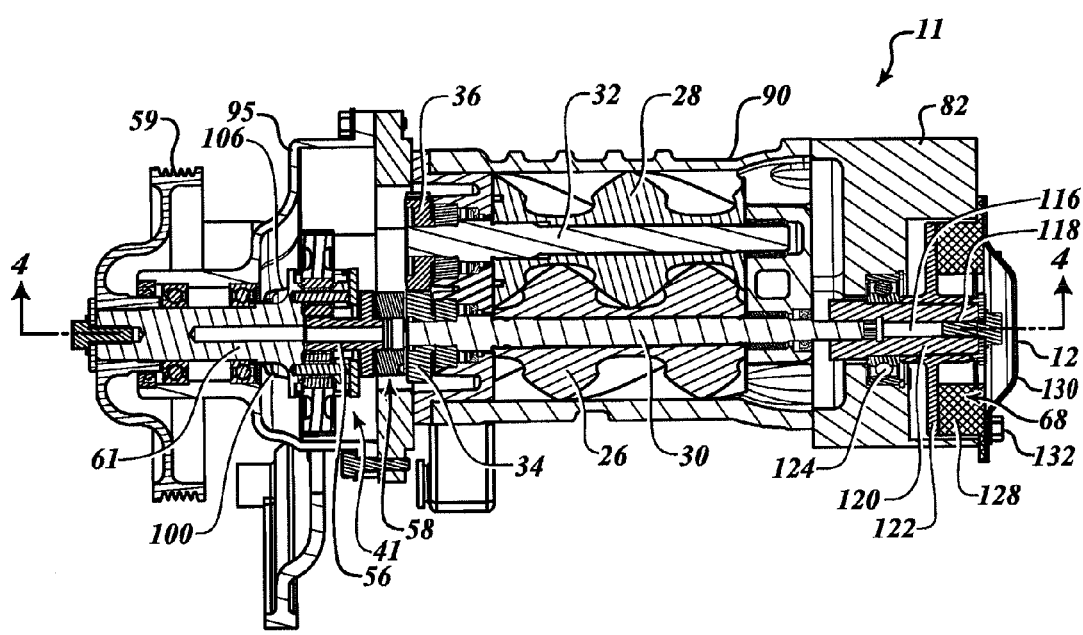
FIG. 3 is a schematic illustration in cross-sectional view of the supercharger assembly taken at lines 3-3 in FIG. 2.

The supercharger 12 can have a set of rotors 24 with a first rotor 26 that can mesh with a second rotor 28 (the second rotor 28 being visible in FIG. 3). Each of the rotors 26, 28 has multiple lobes. The supercharger 12 can boost the air pressure upstream of the plenum 18, forcing more air into engine cylinders, and thus increasing engine power to power a drive axle 21 through a transmission 22.

The supercharger 12 can be a fixed displacement supercharger, such as a Roots-type supercharger, that outputs a fixed volume of air per rotation. The increased air output then becomes pressurized when forced into the plenum 18. A Roots-type supercharger is a volumetric device, and therefore is not dependent on rotational speed in order to develop pressure. The volume of air delivered by the Roots-type supercharger per each rotation of the rotors 26, 28 is constant (i.e., does not vary with speed). A Roots-type supercharger can thus develop pressure at low engine and rotor speeds (where the supercharger is powered by the engine) because the Roots-type supercharger functions as a pump rather than as a compressor. Compression of the air delivered by the Roots-type supercharger 12 takes place downstream of the supercharger 12 by increasing the mass of air in the fixed volume engine plenum 18. Alternatively, the supercharger 12 can be a compressor, such as a centrifugal-type supercharger that compresses the air as it passes through the supercharger 12, but with the compression and thus the volume of air delivered to the throttle body 16 and air pressure in the plenum 18 being dependent on compressor speed.

The supercharger assembly 11 includes a planetary gearing arrangement 41 with a sun gear member 42, a ring gear member 44, and a carrier member 46 that rotatably supports a set of pinion gears 47 that can mesh with both the ring gear member 44 and the sun gear member 42. The sun gear member 42 is referred to as the third member, the ring gear member 44 is referred to as the first member, and the carrier member 46 is referred to as the second member of the planetary gear set 41. The planetary gear set 41 is a simple planetary gear set. In other embodiments, a compound planetary gear set can be used.

As shown in FIG. 3, the first rotor 26 rotates on a first shaft 30 and has multiple lobes that mesh via a set of intermeshing timing gears 34, 36 with multiple lobes of the second rotor 28. It should be understood that the rotors 26, 28 mesh in that their lobes interfit with one another when the rotors 26, 28 are rotating. However, the lobes of the rotors 26, 28 do not contact one another. The second rotor 28 rotates on a second shaft 32. The second shaft 32 is driven by the first shaft 30 through the set of intermeshing timing gears 34, 36. Specifically, a first gear 34 is mounted on the first shaft 30 to rotate with the first rotor 26. A second gear 36 is mounted on the second shaft 32 to rotate with the second rotor 28. The first gear 34 meshes with the second gear 36.

As shown in FIG. 1, the engine 13 has a crankshaft 48 that can be operatively connected with the carrier member 46 through a belt drive 49 when an electromagnetic clutch 55 is engaged to connect a pulley 57 mounted on the crankshaft 48 for rotation with the crankshaft 48. The pulley 57 and crankshaft 48 are thereby drivingly connected through a belt 63 with a pulley 59 mounted to a pulley shaft 61 to rotate with the pulley shaft 61. The pulley shaft 61 is connected to rotate with the carrier member 46 at the same speed as the carrier member 46.

The clutch 55 is a normally closed clutch, in a normally engaged state in which a clutch pack has a first set of plates 31 splined to the crankshaft 48 engaged with a second set of plates 33 splined to a clutch housing 35 that is rigidly connected for rotation with the pulley 57. A spring 37 biases an apply plate 38 toward the sets of plates 31, 33 to maintain the clutch 55 in an engaged state. A coil 39 is energized to create a magnetic force to move the plate 38 axially away from the clutch plates 31, 33, overcoming the biasing force of the spring 37, and thereby disengaging the clutch 55. The coil 39 is selectively energized by a control system that includes a system controller 65, such as an engine controller, operable to provide control signals to clutch 55. The controller 65 is also operatively connected to the motor controller 62, and to an electromagnetic brake, a bypass valve 70 and the throttle 14, as discussed herein. Any other type of clutch, including a normally open clutch, can be used in place of clutch 55.

An electric motor-generator/generator 50 can transfer torque to or receive torque from the ring gear member 44 through a gear train that includes a first gear member 53 that meshes with a second gear member 54. The motor-generator 50 has a rotatable motor shaft 52 with the first gear member 53 mounted on the motor shaft 52. The first gear member 53 can mesh with the second gear member 54, which can be a stepped gear member that meshes with the ring gear member 44. The sun gear member 42 rotates with a shaft 56 that is connected to the first shaft 30 through a semi-flexible coupling member 58 so that the sun gear member 42 rotates at the same speed as the first rotor 26 of the supercharger 12. The coupling member 58 flexes to absorb torsional and axial vibrations between the first shaft 30 and a shaft 56 connected with the sun gear member 42. Rotation of the first rotor 26 causes rotation of the second rotor 28 via the intermeshing gears 34, 36.

The electric motor-generator 50 has an integrated electronic motor controller 62 that controls operation of the motor-generator 50 to function as a motor or as a generator. When the motor-generator 50 functions as a motor, it receivesored electrical energy from an energy storage device 64 such as a battery through power cables 66. The controller 62 may include a power inverter to convert the electrical energy from direct current to alternating current when energy flows from the energy storage device 64 to the motor-generator 50, and from alternating current to direct current when energy flows from the motor-generator 50 to the energy storage device 64. The system controller 65 can be an engine controller, operatively connected to the motor controller 62 via CAN bus or similar architecture, and is also configured to control engagement of the clutch 55, engagement of a brake 68, discussed herein, the position of the throttle 14, and the position of a bypass valve 70.

The belt drive 49 may be referred to as a front engine accessory drive (FEAD). One or more vehicle accessories 78 can be driven by the engine crankshaft 48 via the belt 63 of the belt drive 49 when clutch 55 is engaged or by the motor-generator 50 when the clutch 55 is not engaged, brake 68 is engaged to stop the sun gear 42 and the engine 13 is off, such as during an engine start/stop mode discussed herein. The vehicle accessories 78, such as an engine coolant pump or an air conditioning compressor, are operatively connected to a shaft 79 that rotates with a pulley 76 driven by the belt 63.

The sun gear member 42 is connected for common rotation with the first rotor 26 by the shafts 56, 30 and through the coupling member 58. The brake 68 can be controlled by the system controller 65, to selectively ground the first shaft 30 to a stationary housing assembly 80 of the supercharger assembly 11. Specifically, the brake 68 is an electromagnetic brake packaged in a cavity 69 (shown in FIG. 4) of an inlet cover portion 82 of the housing assembly 80 so that the inlet cover portion 82 supports the brake 68. The brake 68 is selectively actuated to ground the first shaft 30 to the inlet cover portion 82, as further described with respect to FIG. 4.

Air flows across the supercharger assembly 11, between the rotors 26, 28, from an air inlet 84 of an air inlet passage 85 in the inlet cover portion 82, shown schematically in FIG. 1, through an air inlet opening 84A (shown in FIG. 21) of the rotor housing portion 90, to an air outlet 86 (best shown in FIG. 23) of an air outlet passage 88 partially defined by a rotor housing portion 90 of the housing assembly 80. The rotor housing portion 90 radially surrounds the rotors 26, 28 and the shafts 30, 32. Shaft 30 extends out of an axial end of the rotor housing portion 90 into the inlet cover portion 82. A portion 92 of a bypass passage 94 is defined by the inlet cover portion 82. The bypass passage 94 is also referred to as a bypass route. The bypass valve 70 is supported within the bypass passage 94 and substantially closes the bypass passage 94 when in the closed position shown in FIG. 1. The position of the bypass valve 70 is schematic, and is intended to represent a position in which air flow through the passage 94 is completely blocked by the valve 70. The bypass valve 70 can be controlled by the controller 65 to move to an open position 70A shown in phantom in FIG. 1. When the bypass valve 70 is in the open position 70A, air can flow from the air inlet portion 84 through the bypass passage 94 to the throttle body 16, bypassing the rotors 26, 28, such as when engine boost is not desired.

Figure 2:
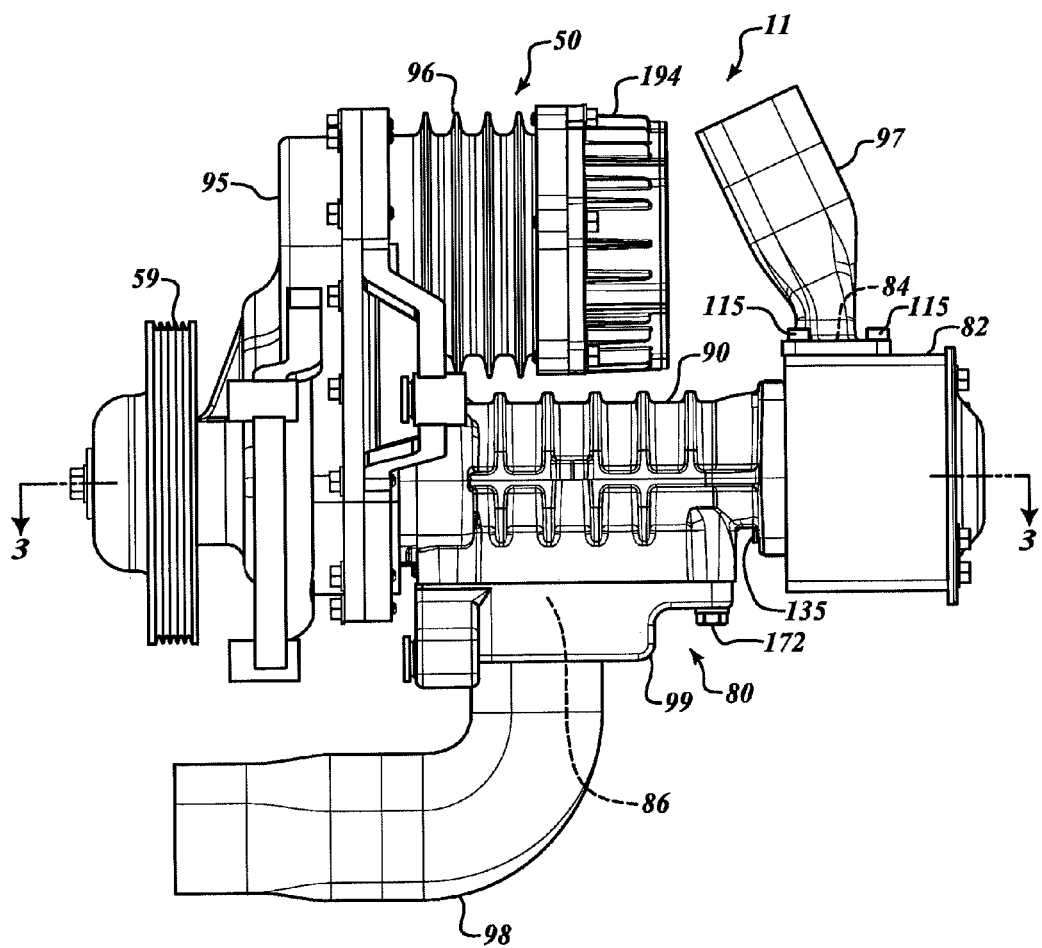
FIG. 2 is a schematic illustration in side view of the supercharger assembly of FIG. 1 within the housing assembly.
Figure 4:
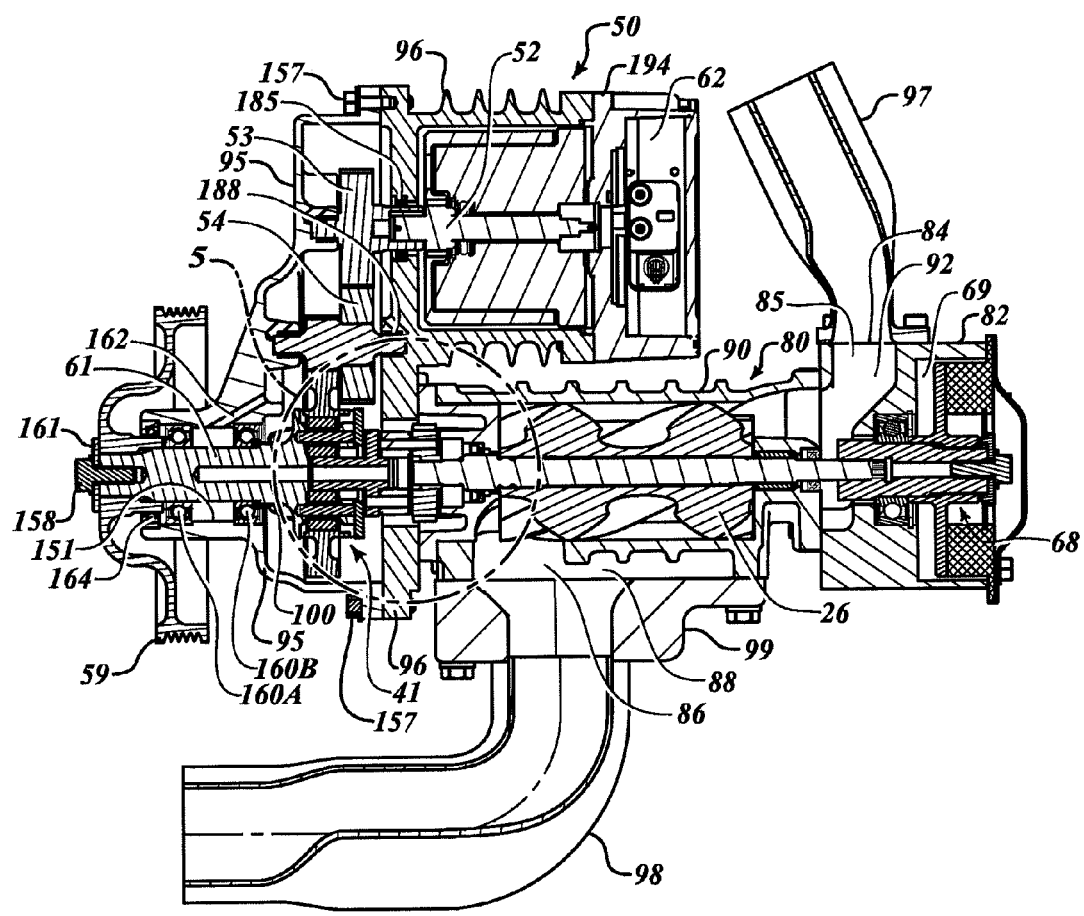
FIG. 4 is a schematic illustration in cross-sectional view of the supercharger assembly taken at lines 4-4 in FIG. 3.

FIGS. 2 and 4 show a gear cover portion 95 mounted to the rotor housing portion 90 to surround and enclose the planetary gearing arrangement 41 and the gear members 53, 54. A motor housing portion 96 of the motor-generator 50 mounts to the gear cover portion 95. Both the gear cover portion 95 and the motor housing portion 96 are portions of the stationary housing assembly 80. The housing assembly 80 includes an inlet pipe 97 that attaches to the inlet cover portion 82 to extend the inlet passage 85. The housing assembly 80 also includes an outlet pipe 98 attached to an outlet housing 99 that mounts to the rotor housing portion 90 to extend the outlet passage 88. The outlet pipe 98 operatively connects to the throttle body 16 shown in FIG. 1 through an additional pipe extension (not shown) connected to the outlet pipe 98.

Movement of pistons within the engine cylinders creates a vacuum that pulls air through the plenum 18. When the throttle 14 is in the relatively closed position shown in FIG. 1, the vacuum created by the engine 13 creates a pressure differential in the form of a pressure drop across the throttle 14. When the throttle 14 is moved to a relatively open position 14A, the pressure drop across the throttle 14 is relieved. However, by controlling the motor-generator 50, the pressure differential can be transferred to the rotors 26, 28, creating a torque on the rotors 26, 28 that can be captured as electrical energy in the energy storage device 64.

That is, a pressure differential is created across the supercharger 12 from the air inlet 84 to the air outlet 86 upstream in air flow to the throttle 14 when the throttle 14 is in the relatively open position 14A. As described below, the throttle 14 and the bypass valve 70 can be selectively controlled in conjunction with the engine 13 to provide various operating modes, such as providing a desired intake air pressure to the engine cylinders, while allowing the supercharger 12 and the motor-generator 50 to be used to provide regenerative electrical energy to the energy storage device 64. The stored electric energy can be used to provide power to vehicle electrical systems and devices in place of an alternator and/or for providing torque at the crankshaft 48 when the motor-generator 50 is controlled to function as a motor.

The engine assembly 10 with the supercharger assembly 11 enables a variety of different operating modes that can be selected and commanded by the controller 65 based on vehicle operating conditions such as engine torque requirements, and the state of charge of the energy storage device 64. An engine-off operating mode may be used to provide torque at the shaft 61 to power the auxiliary vehicle components 78 when the engine 13 is off. As used herein, the engine 13 is off when fuel and/or ignition is not provided for combustion in the engine 13. In the engine-off operating mode, the controller 65 controls the motor-generator 50 to function as a motor, engages the brake 68 and causes the clutch 55 to be disengaged. Torque is transferred from the motor-generator 50 to the auxiliary components 78 through the planetary gear set 41.

If vehicle operating conditions indicate that the engine 13 should be started, the engine assembly 10 can be transitioned from the engine-off operating mode to an engine-start operating mode simply by engaging the clutch 55 while still controlling the motor-generator 50 to function as a motor and keeping the brake 68 engaged. Torque from the motor-generator 50 will thus be applied to the crankshaft 48 to start the engine 13. Once the engine 13 is started, the motor-generator 50 can freewheel, with the controller 65 neither directing electric energy from the energy storage device 64 to the motor-generator 50, nor directing electric energy from the motor-generator 50 to the energy storage device 64. The start/stop ability of the motor-generator 50 allows the engine 13 to be shut off rather than idle, such as at traffic lights, with an expected increase in fuel economy and reduction in carbon dioxide emissions. Thus, fuel savings can be realized during the period that the engine 13 is shutoff, and restarting the engine 13 can be accomplished with the electric energy generated from recaptured energy stored in the battery.

Alternatively, once the engine 13 is started, the motor-generator 50 can function either as a motor or as a generator. With the engine 13 on, engine boost, brake regeneration and throttle loss regeneration modes described herein may be used. An engine boost operating mode can be established by the controller 65 when additional torque is required at the drive axle 21, such as for vehicle acceleration. To establish the boost operating mode with the engine 13 on, the clutch 55 is engaged and the brake 68 is disengaged. The motor-generator 50 is controlled to function as a motor and the bypass valve 70 is in the closed position shown in FIG. 1. The engine 13 provides torque to drive the first shaft 30 through the belt drive system 49 and the carrier member 46. The motor-generator 50 provides torque to drive the first shaft 30 through the intermeshing gears 53, 54 to the ring gear member 44. The speed of the first shaft 30 is thus increased relative to the speed of shaft 61 using the motor-generator 50 to adjust the speed of ring gear member 44 and, through the planetary gearing arrangement 41, set the desired rotational speed of shafts 56 and 30, providing desired boost pressure.

The amount of boost pressure provided at the engine plenum 18 can thus be varied during the engine boost operating mode in response to varying torque demand. First, the controller 65 can vary the speed of the motor-generator 50 to control the amount of boost pressure developed in the plenum 18 during the engine boost operating mode. Alternately or in addition, the controller 65 can control the position of the bypass valve 70, such as by moving the bypass valve 70 from the closed position shown in FIG. 1 to the open position 70A. Air from the air inlet 84 can thus flow through the bypass passage 94, reducing the volume of air that will flow through the rotor housing 90 past the rotors 26, 28 and thereby reducing the pressure of air at the plenum 18 in comparison to pressure that develops when air flows through the rotors 26, 28. Operation of the bypass valve 70 by opening the bypass valve 70 to the fully open position 70A can allow a relatively quick adjustment in air pressure in the plenum 18 in comparison to a more gradual adjustment achieved by changing the speed of the motor-generator 50. A more modulated adjustment in boost pressure can be achieved by placing the bypass valve 70 in an intermediate position between the fully open position 70A and a fully closed position. Control of both the speed of the motor-generator 50 and the position of the bypass valve 70 allows a tailored engine boost in response to engine torque demand. Because the boost pressure provided in the plenum 18 by the supercharger 12 is independent of engine speed, a relatively constant torque can be obtained at the crankshaft 48 across the entire range of operating speeds of the engine 13. Alternately, the torque at the crankshaft 48 can be tailored as desired across the range of engine operating speeds.

When the engine 13 is on and engine boost is not required, such as during vehicle cruising at a relatively steady vehicle speed, the controller 65 can slow the speed of the supercharger 12 and control the throttle 14 so that the throttling losses (i.e., the pressure drop associated with the vacuum created by the moving engine cylinders) can be applied across both the throttle 14 and the supercharger 12 with the bypass valve 70 closed. The position of the throttle 14 can be balanced with the pressure drop desired across the supercharger 12 and air flows through both the supercharger 12 and past the at least partially closed throttle 14 to reach the engine cylinders. The bypass valve 70 can also be controlled during this mode to allow air to bypass the supercharger 12 when a rapid change in air flow to the engine 13 is required. The torque generated by the pressure drop across the supercharger 12 will be applied to the sun gear member 42, and thus to the engine crankshaft 48 and also to the motor-generator 50 (when controlled to operate as a generator) via the torque split provided by the planetary gearing arrangement 41. This operating mode can be referred to as a throttling loss regeneration mode. All or a portion of the torque generated by the pressure drop across the supercharger 12 can be converted to electric energy stored in the energy storage device 64 by controlling the motor-generator 50 to function as a generator. The stored electric energy generated from the pressure drop-induced torque is referred to as being from "recaptured throttling losses."

During an extended cruising period, when engine boost is not required, the throttling loss regeneration mode can be maintained until the energy storage device 64 reaches a predetermined maximum state of charge. Then, the brake 68 can be applied, the bypass valve 70 opened to position 70A, and the motor-generator 50 controlled to function as a motor to apply torque to the engine crankshaft 48 until the energy storage device 64 reaches a predetermined minimum state of charge. This cycling of charging and depleting the energy storage device 64 can continue throughout the cruising period.

In one example, the pressure drop across the supercharger 12 is increased an amount delta. This delta, which results in a larger pressure drop across the supercharger 12 for all engine speeds, assures that the pressure drop does not diminish to the point that the pressure differential is essentially zero. In one example, the delta is applied at least at low engine speeds. In another example, the delta is applied at all engine speeds. In this manner, continuous energy can be captured through throttle loss regeneration, with only a marginal impact on fuel economy.

In such an example, the control system is configured to control the electric motor-generator to function as the generator and the throttle valve is controlled to move to a relatively open position so that the pressure drop across the supercharger is equal to or greater than the original throttle pressure drop such that the electric motor-generator, through the planetary gearing arrangement, captures the throttling as electric energy.

The supercharger assembly 11 can also be controlled to capture energy during vehicle braking in a regenerative braking mode. When vehicle braking slows the drive axle 21, the controller 65 is configured to engage the brake 68 and control the electric motor-generator 50 to function as a generator with torque applied to the electric motor-generator 50 in a reverse direction that is the opposite of the direction of torque supplied by the electric motor-generator 50 when the electric motor-generator functions as a motor. Reverse torque is thus applied to the crankshaft 48 through the planetary gearing arrangement 41 and electric energy generated by the electric motor-generator 50 is stored in the energy storage device 64.

Figure 19:
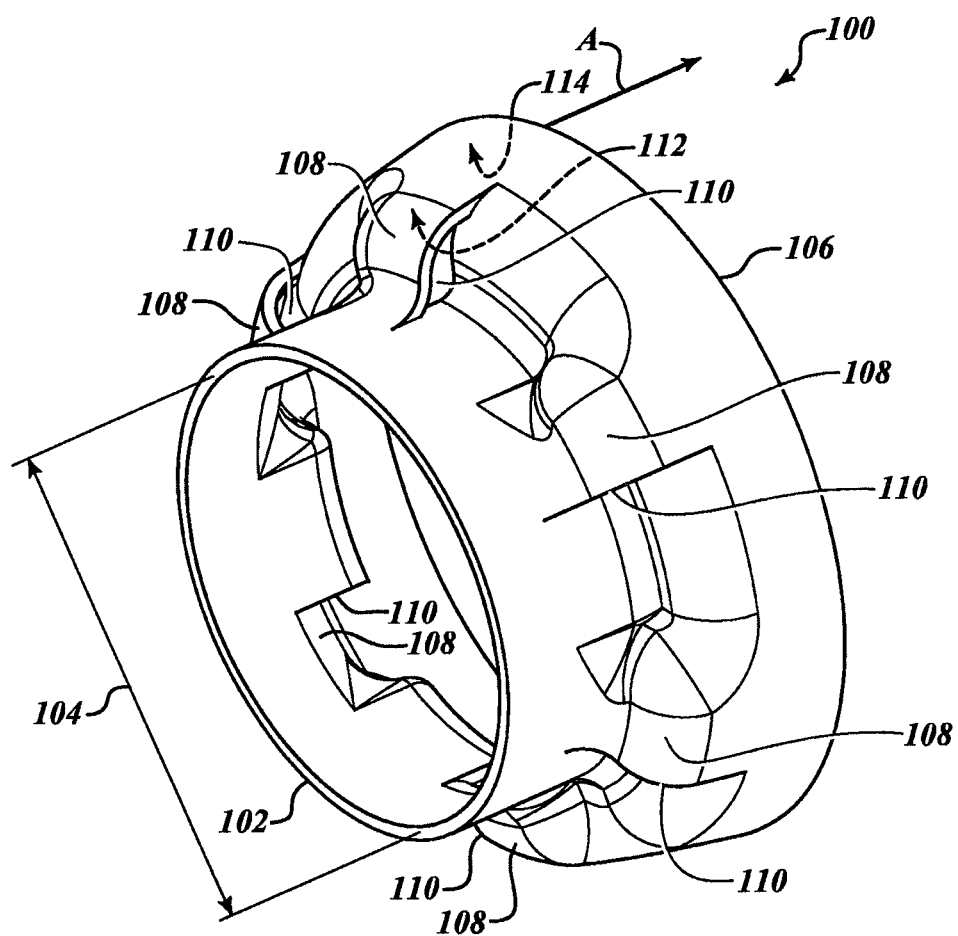
FIG. 19 is a schematic perspective illustration of an oil slinger mounted to a pulley shaft in FIG. 3.

FIG. 1 shows an oil slinger 100 mounted to the pulley shaft 61 to rotate with the pulley shaft 61. FIG. 19 is a perspective view of the oil slinger 100 disconnected from the pulley shaft 61. The oil slinger 100 is an annular member with a first end 102 that has a first inner diameter 104 configured to fit to the outer surface of the pulley shaft 61. A second end 106 has a larger diameter so that the oil slinger 100 fans out from the pulley shaft 61 toward the second end 106. The oil slinger 100 is positioned on the pulley shaft 61 so that the second end 106 faces the planetary gearing arrangement 41, as best shown in FIG. 3. FIG. 19 shows that the oil slinger 100 is formed with a series of scooped portions 108 about a periphery of the oil slinger 100 generally midway between the ends 102, 106. Each of the scooped portions 108 has an opening 110, with each of the openings 110 facing the same direction of rotation. Each scooped portion 108 tapers in an axial direction between the larger end 106 and the smaller end 102. When the pulley shaft 61 rotates in a clockwise direction, the oil slinger 100 also rotates in a clockwise direction and oil mist within the gear cover portion 95 will enter through the openings 110 and be captured by the scooped portions 108. The oil mist will contact the inner surface 112 of the scooped portion 108. Rotation of the oil slinger 100 will cause the oil mist to travel toward the end 106 along an inner surface 114 of the oil slinger 100 and be propelled from the oil slinger 100 in the direction of arrow A. The oil will be strewn generally toward the planetary gear set 41 for lubrication of the planetary gear set 41.

FIG. 2 shows the supercharger assembly 11 with the various portions of the housing assembly 80 attached to one another. The inlet pipe 97 has openings that align with openings 113 of the inlet cover portion 82, shown in FIG. 18, so that fasteners 115 can be used to attach the inlet pipe 97 to the inlet cover portion 82 over the air inlet 84. As used herein, a fastener can be any suitable component used to attach two adjacent components, such as a bolt, a screw, or other suitable fastener.

FIG. 3 shows an extension portion 116 of the first shaft 30 that has a toothed end portion 118. A rotating member 120 with a flange 122 is splined to the toothed end portion 118 and is supported at the inlet cover portion 82 by a bearing 124 to be rotatable relative to the inlet cover portion 82. The extension portion 116, toothed end portion 118, rotating member 120 and flange 122 are within the cavity 69. An electromagnetic brake 68 is selectively actuatable by the controller 65 by wires (not shown) that extend through a wire access opening 126 shown in FIG. 18 to provide electric energy used to actuate a coil 128 within the brake 68 to hold the flange 122 stationary relative to the inlet cover portion 82 via electromagnetic attraction. The coil 128 is shown in FIG. 3 not in FIG. 18. A brake cover 130 is attached to the inlet cover portion 82 with fasteners 132 that extend through openings 134 in the inlet cover portion 82. As discussed with respect to FIG. 1, the inlet cover portion 82 also defines a portion 92 of the bypass passage 94. The portion 92 is in fluid communication with the inlet 84 and extends through the inlet cover portion 82. The portion 92 is shown over the brake cavity 69 and extending out of a bottom of the inlet cover portion 82 in FIG. 18. For illustrative purposes, portion 92 is shown only above the brake 68 in FIG. 1. Any suitable orientation of the portion 92 in the inlet cover portion 82 may be used. The bypass passage 94 is connected to the inlet cover portion 82 to be in communication with the portion 92 alternately bypass passage 94 may be attached upstream from inlet cover 82 and inlet pipe 97 via a plumbing tee or the like.

FIG. 2 shows a fastener 135 that is used to attach the inlet cover portion 82 to the rotor housing portion 90. Although only one fastener 135 is shown, multiple additional fasteners 135 can be placed at various positions around the interface of the rotor housing 90 and the inlet cover portion 82. FIG. 3 shows that when the inlet cover portion 82 is attached to the rotor housing portion 90, the first shaft 30 extends from the rotor housing portion 90 into the inlet cover portion 82.

Figure 5:
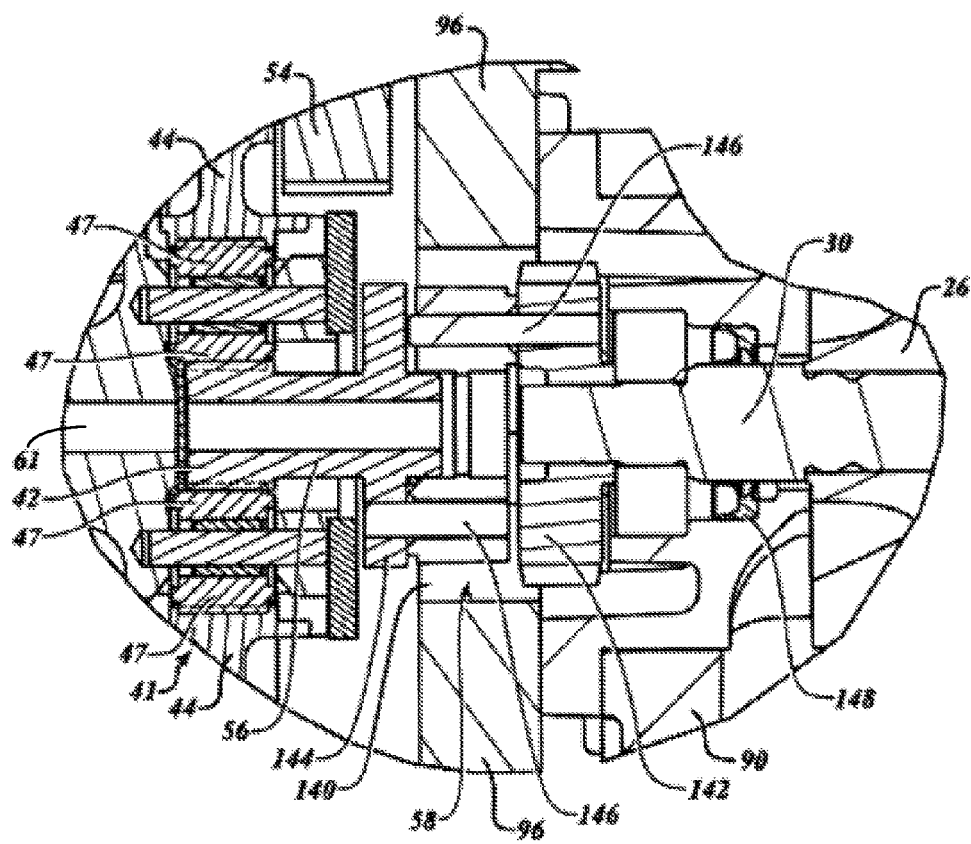
FIG. 5 is a schematic illustration of a portion of the supercharger at the area indicated in FIG. 4.
Figure 6:
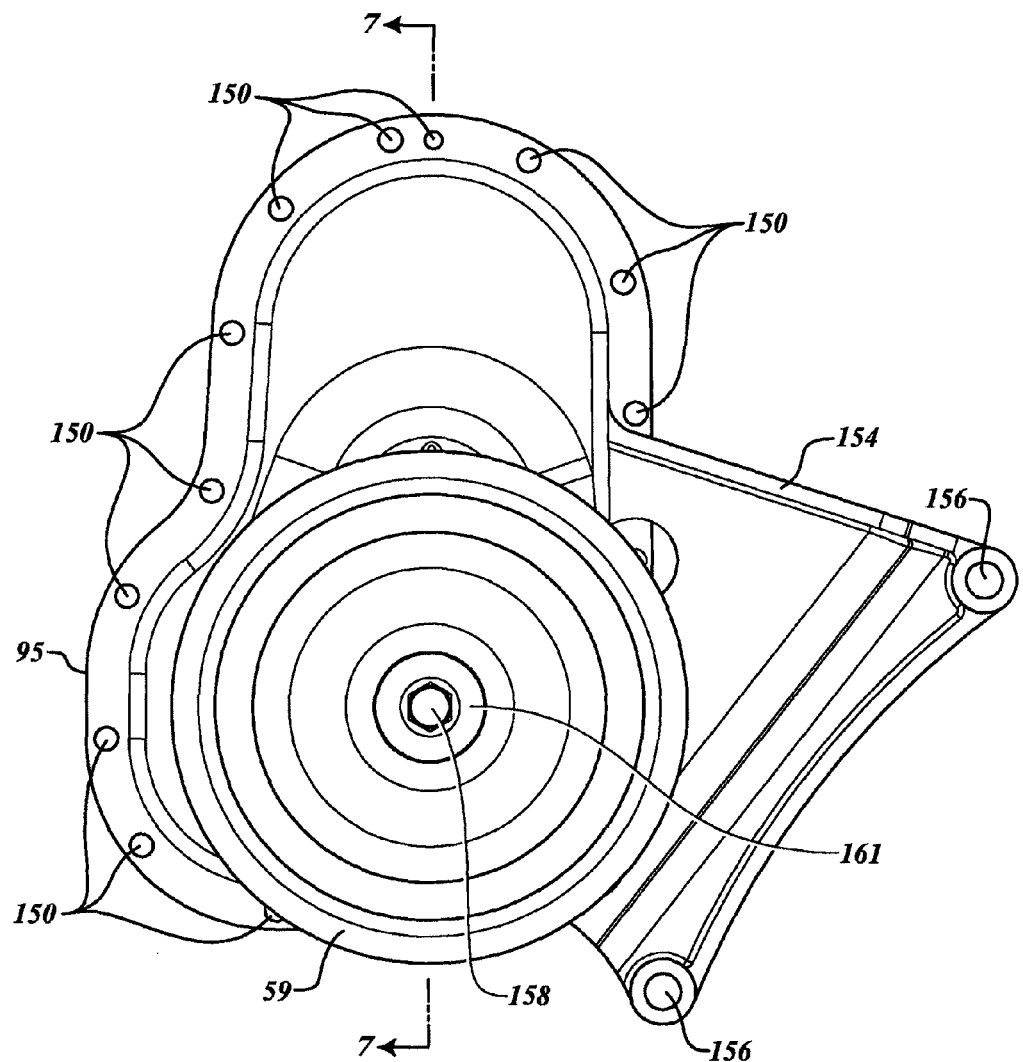
FIG. 6 is a schematic illustration in an end view of a gear cover portion of the housing assembly.
Figure 7:
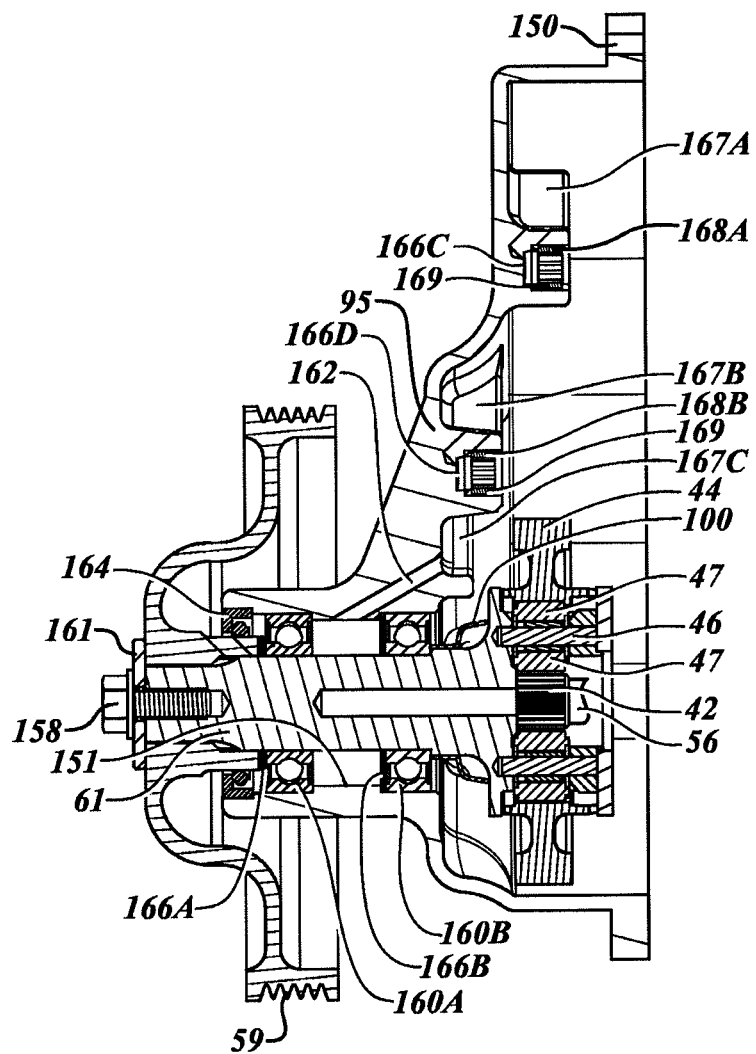
FIG. 7 is a schematic illustration in cross-sectional view taken at lines 7-7 in FIG. 6 of a portion of the supercharger assembly within the gear cover portion.
Figure 8:
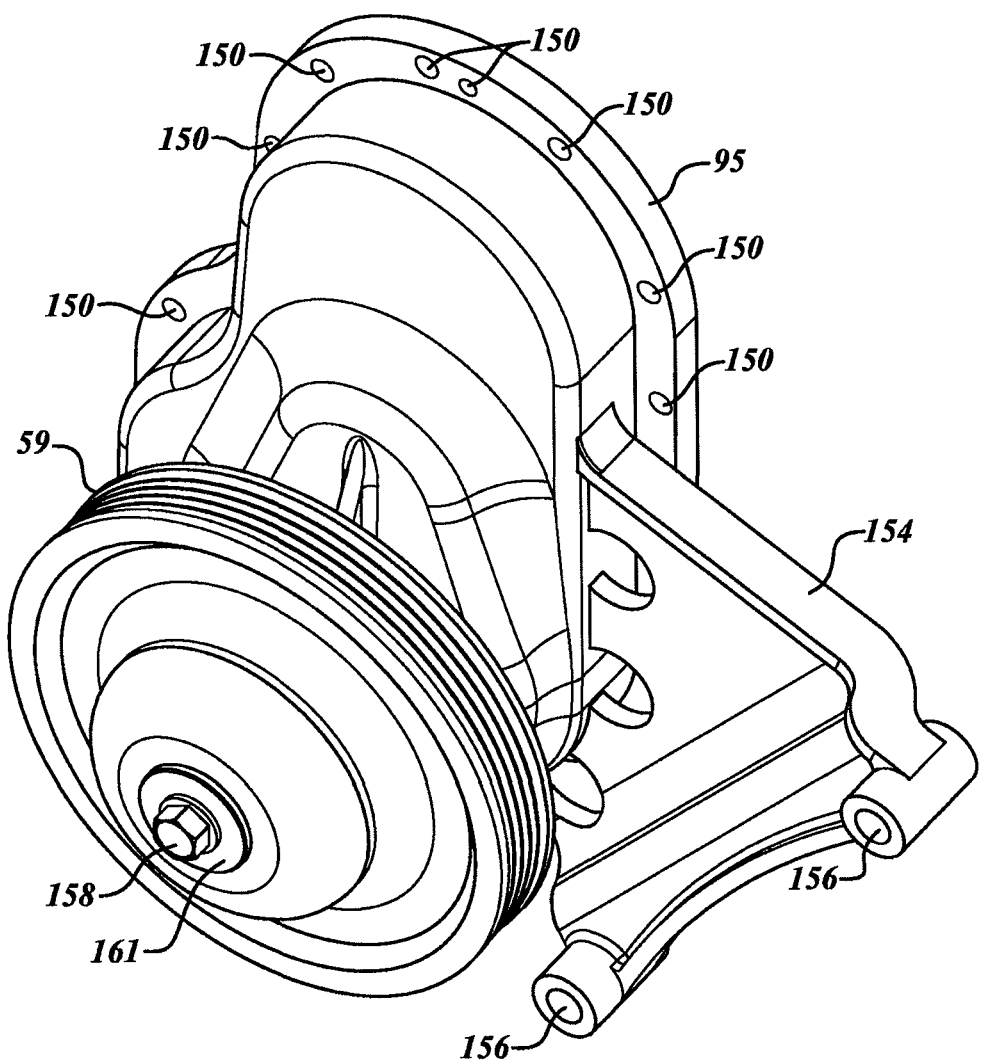
FIG. 8 is a schematic perspective illustration of the gear cover portion.

FIG. 5 is a closer view of a portion of the supercharger assembly 11 that shows the planetary gearing arrangement 41 and its operative connection to the first shaft 30. Specifically, the coupling member 58 is positioned within an opening 140 of the motor housing portion 96. The coupling member 58 includes a first member 142 fit to the first shaft 30 and pinned to a flange 144 of the shaft 56 with circumferentially positioned pins 146. The coupling member 58 absorbs torsional vibrations that may be caused by pressure pulsation emanating from the supercharger assembly 11 on shaft 30 or engine pulsation from shaft 61. A seal 148 seals the first shaft 30 to the rotor housing 90 to prevent leakage of air from within the rotor housing 90. FIGS. 6-8 show the gear cover portion 95 including a pattern of fastener openings 150 that match a pattern of fastener openings 152 on the motor housing portion 96, shown in FIG. 13. Fasteners 157 (two shown in FIG. 4) are used to attach the gear cover portion 95 to the motor housing portion 96 through the aligned openings 150, 152. Some of the fastener openings 150 are obscured in FIG. 6 by a mounting flange 154 of the gear cover portion 95. The mounting flange 154 has fastener openings 156 though which fasteners are placed to mount the gear cover portion 95, and thereby the entire supercharger assembly 11, to the engine 13 of FIG. 1.

The pulley 59 is shown with a hex screw 158 extending through an opening in the pulley 59 to mount the pulley 59 to the pulley shaft 61 (shown in FIG. 4). The pulley shaft 61 extends through an opening in the gear cover portion 95. A washer 161 is positioned between the hex screw 158 and the pulley shaft 61. Bearings 160A, 160B shown in FIG. 4 permit the pulley shaft 61 and pulley 59 to rotate relative to the gear cover portion 95. At least one passage 162 though the gear cover portion 95 directs lubricating fluid through the gear cover portion 95 to the bearings 160A, 160B. A seal 164 is positioned between the gear cover portion 95 and the pulley 59 at an opening in the gear cover portion 95 through which the shaft 61 extends. As best shown in FIG. 7, a wave disc spring 166A is positioned between the pulley 59 and the bearing 160A to stop the inner bearing race of bearing 160A from spinning relative to shaft 61 and manage stack-up tolerances. Another wave disc spring 166B is positioned between the bearing 160B and a ledge of the gear cover portion 95 to prevent the outer race of bearing 160B from spinning in gear cover housing 95. Disc springs 166C, 166D are also used between the gear cover portion 95 and motor gear 53 shaft and idler gear 54 shaft ends which ride on needle bearings 168A and 168B housed in recesses 169 of the gear cover portion 95. These disc springs provide wear surfaces and manage tolerance stack-up. Needle bearing 168A allows gear 53 to rotate relative to and extend through the motor housing portion 96. Gear 53 is splined to the motor shaft 52 (shown in FIG. 4). Needle bearings 168B and 188 allows the gear 54 to rotate relative to the gear housing portion 95 and motor housing portion 96.

Figure 20:
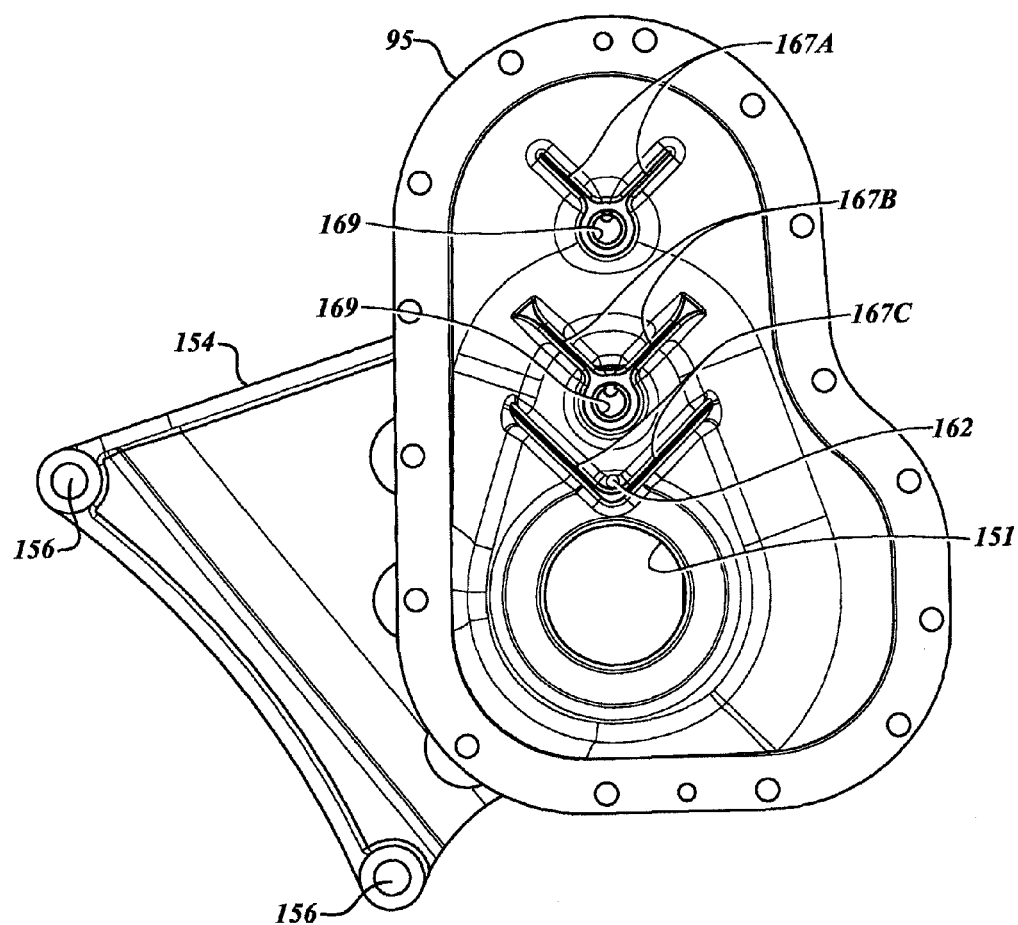
FIG. 20 is a schematic illustration in an opposite end view of the gear cover portion than shown in FIG. 6.

FIG. 20 shows that the gear cover portion 95 has ribs 167A, 167B, 167C that strategically collect and direct oil within the gear cover portion 95. Ribs 167A and 167B generally form a V shape above the recesses 169 in which the needle bearings 168A, 168B are housed. Oil droplets within the gear cover portion 95 will collect on the ribs 167A, 167B and drain to the recesses 169 to lubricate the bearings 168A, 168B. Rib 167C forms a V shape that strategically directs oil in the gear cover portion 95 to the passage 162. Oil drains through the passage 162 to a space in the opening 151 between the bearings 160A, 160B to lubricate the bearings 160A, 160B.

Figure 9:
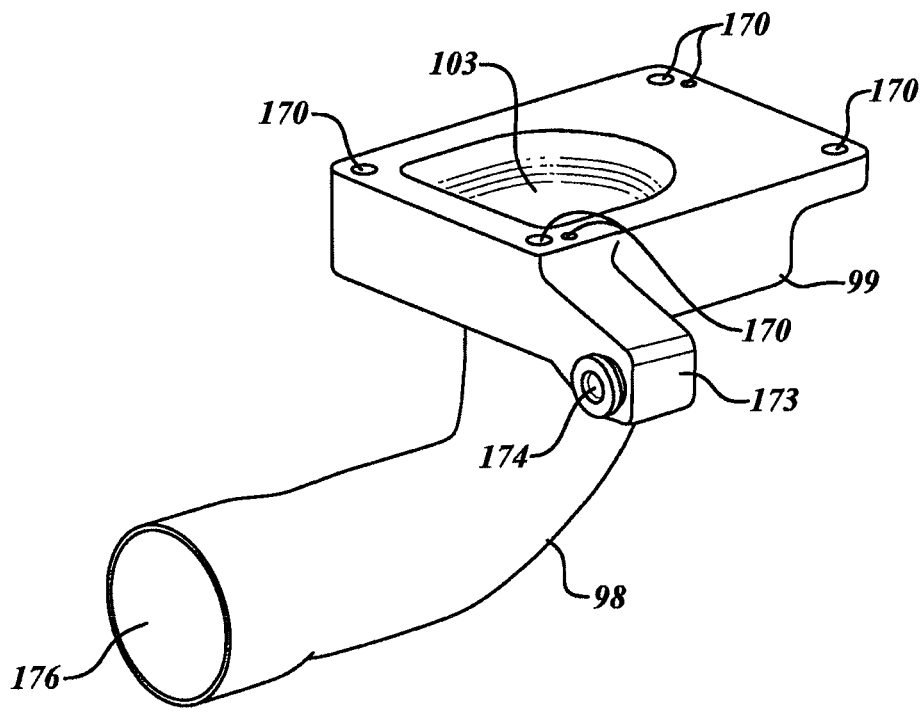
FIG. 9 is a schematic perspective illustration of an outlet housing and outlet pipe of the housing assembly.
Figure 10:
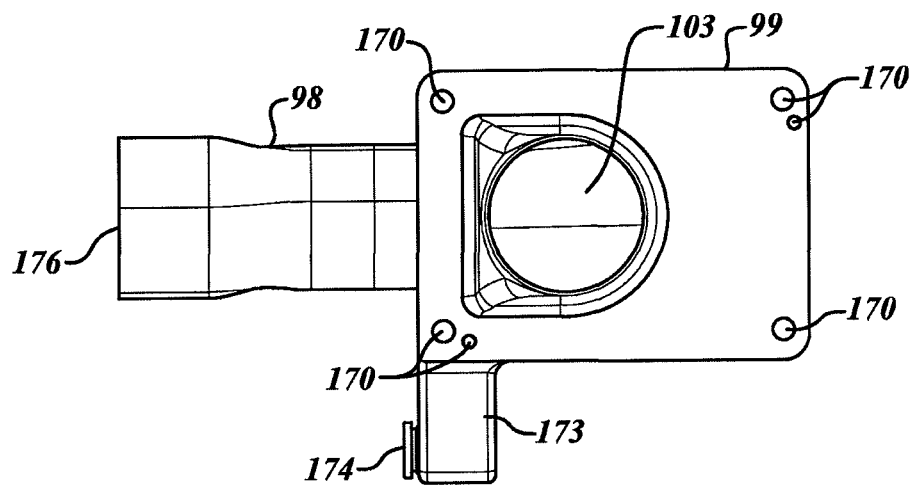
FIG. 10 is a schematic plan view illustration of the outlet housing and outlet pipe of the housing assembly.
Figure 11:
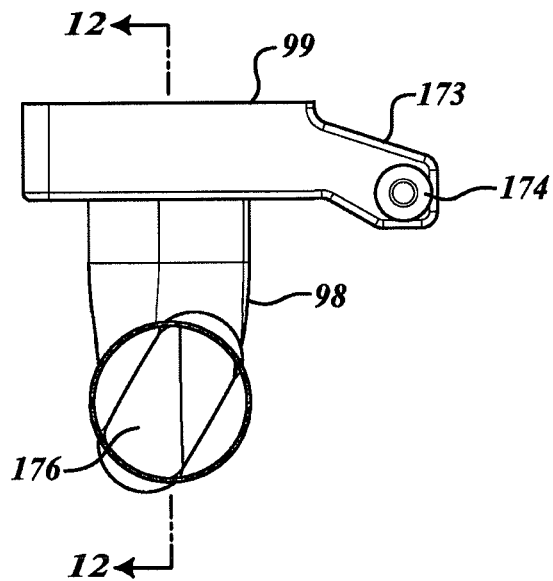
FIG. 11 is a schematic illustration in side view of the outlet housing and outlet pipe of the housing assembly.
Figure 12:
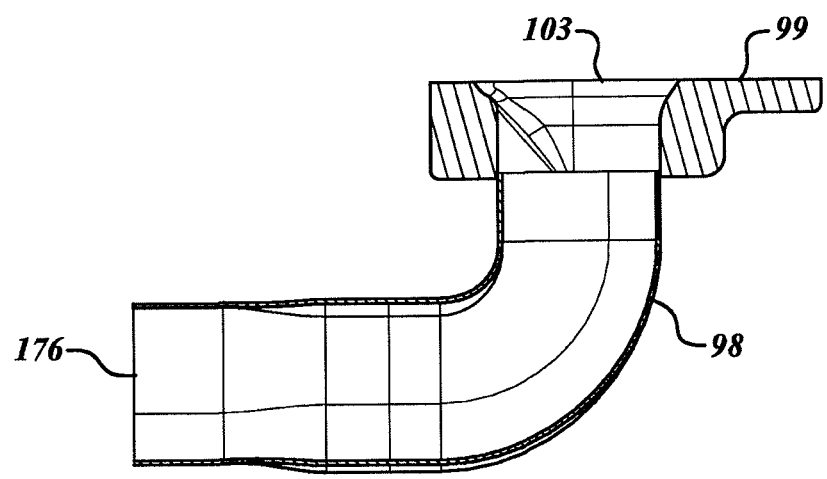
FIG. 12 is a schematic illustration in cross sectional view of the outlet housing and outlet pipe taken at the lines 12-12 in FIG. 11.
Figure 21:
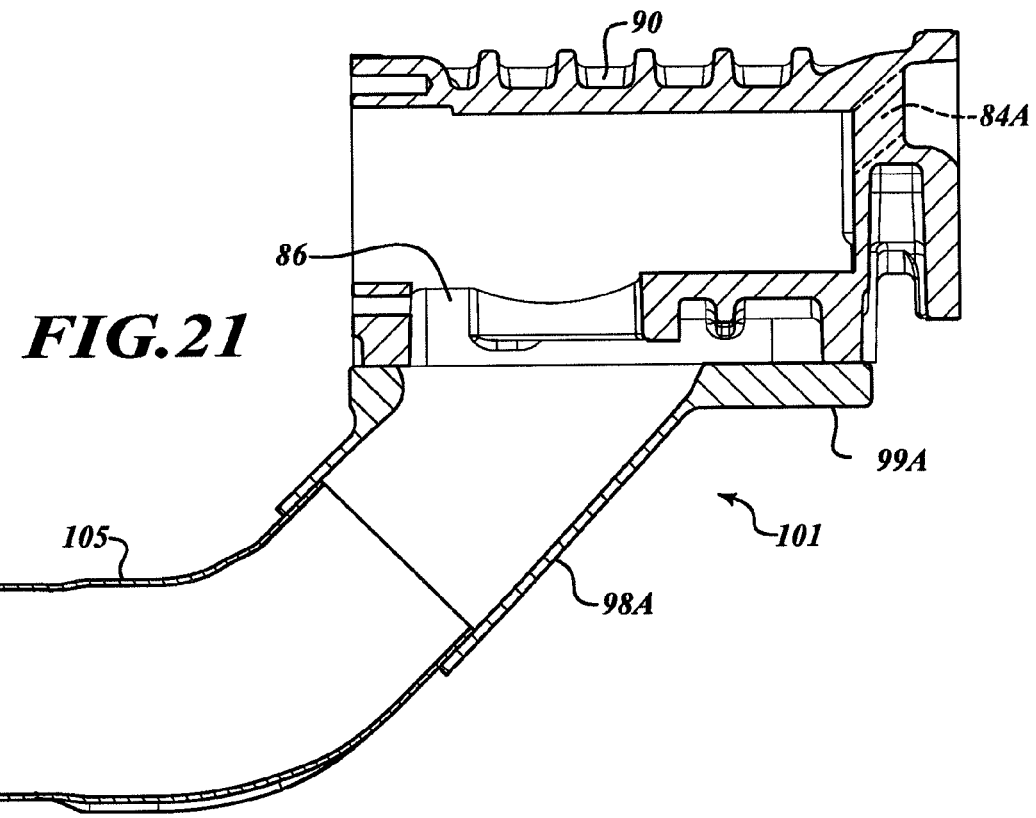
FIG. 21 is a schematic cross-sectional illustration of the rotor housing portion with an outlet component having an outlet housing and an outlet pipe in accordance with another aspect of the present teachings.
Figure 22:
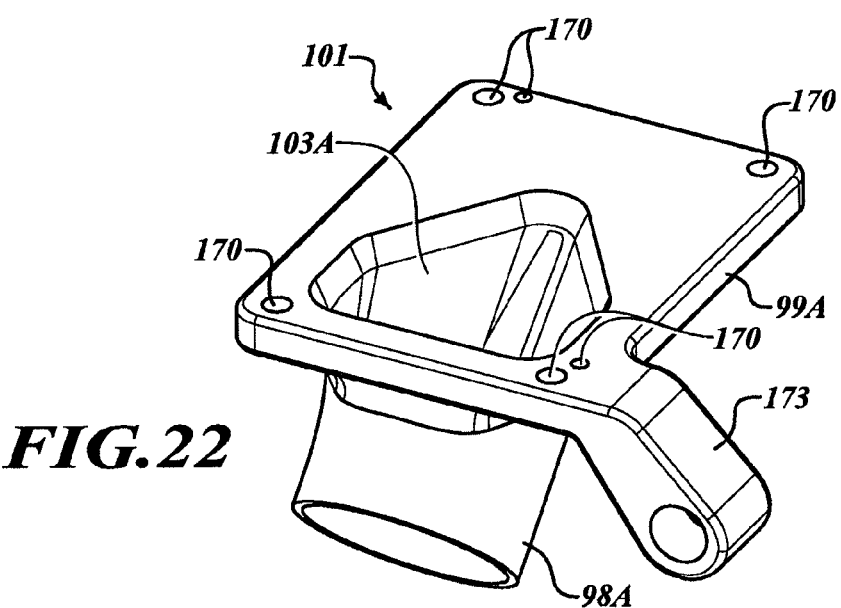
FIG. 22 is a schematic perspective illustration of the outlet component with the outlet housing and outlet pipe of FIG. 21.

FIGS. 9-12 show the outlet housing 99 with the outlet pipe 98 extending from the outlet housing 99. In this embodiment, the outlet pipe 98 and outlet housing 99 are welded together. In the embodiment of FIGS. 21-22, an outlet housing 99A and an outlet pipe 98A are a unitary, one-piece outlet component 101. The outlet housing 99 of FIG. 9 has a pattern of fastener openings 170 that matches a pattern of fastener openings 177 (see FIG. 23) at the rotor housing portion 90 around the air outlet 86. One fastener 172 is shown in FIG. 2 connecting the outlet housing 99 to the rotor housing 90. FIG. 9 shows a flange 173 with an opening 174 that can be used to mount the outlet housing 99 to the engine 13. An opening 103 of the outlet housing 99 is in fluid communication with the air outlet 86 of the rotor housing portion 90. The outlet 176 of the outlet pipe 98 feeds into the throttle body 16 of FIG. 1.

Figure 13:
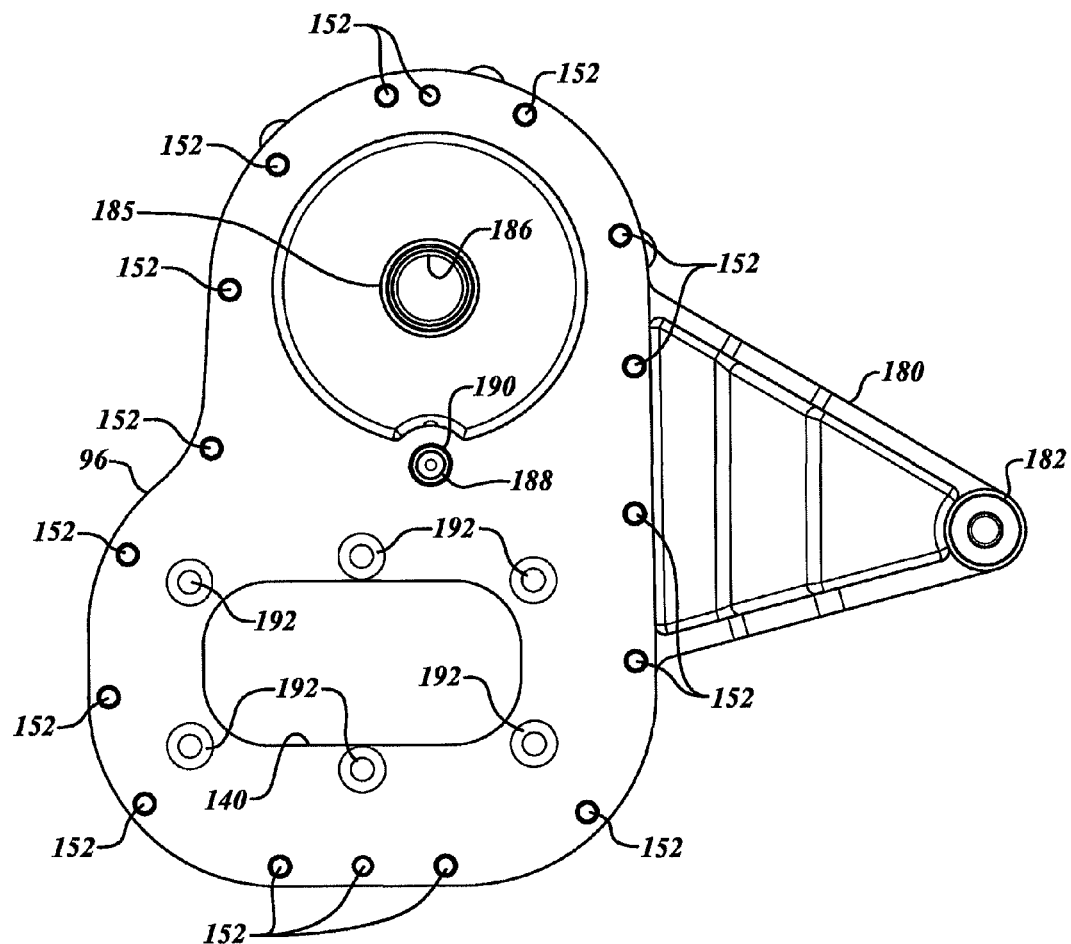
FIG. 13 is a schematic illustration in end view of the motor housing portion.
Figure 14:
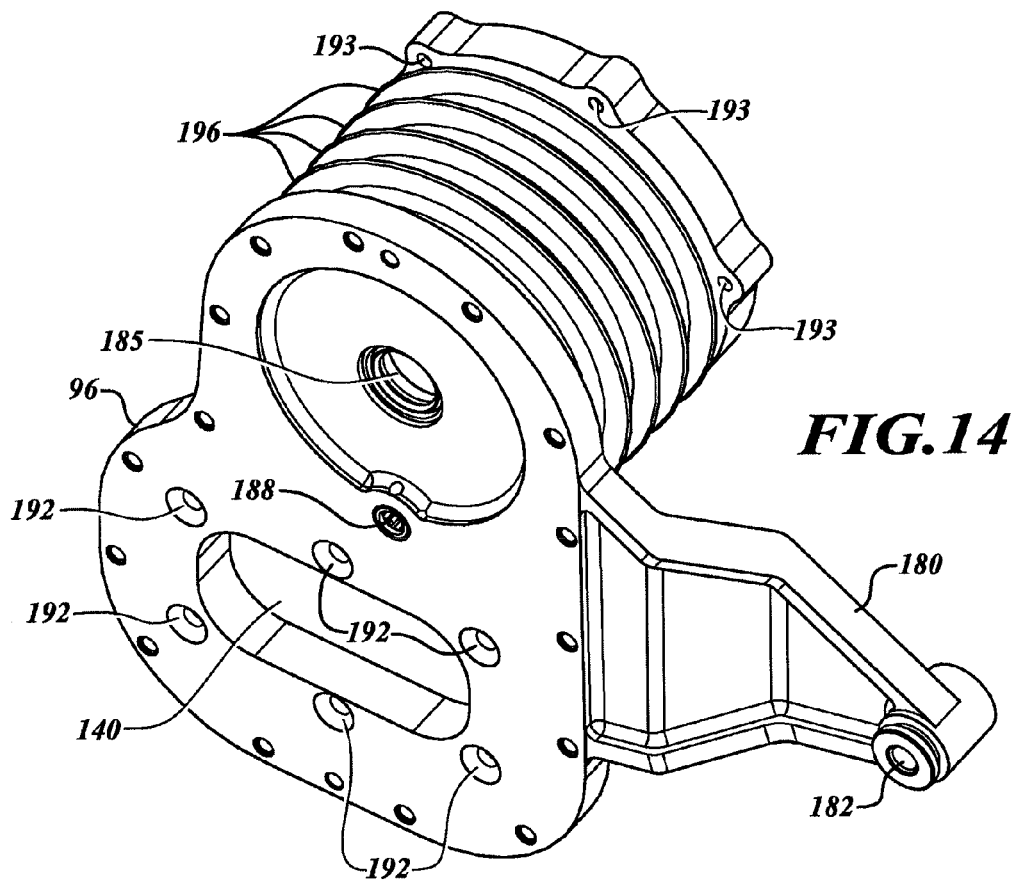
FIG. 14 is a schematic perspective illustration of the motor housing portion.
Figure 15:
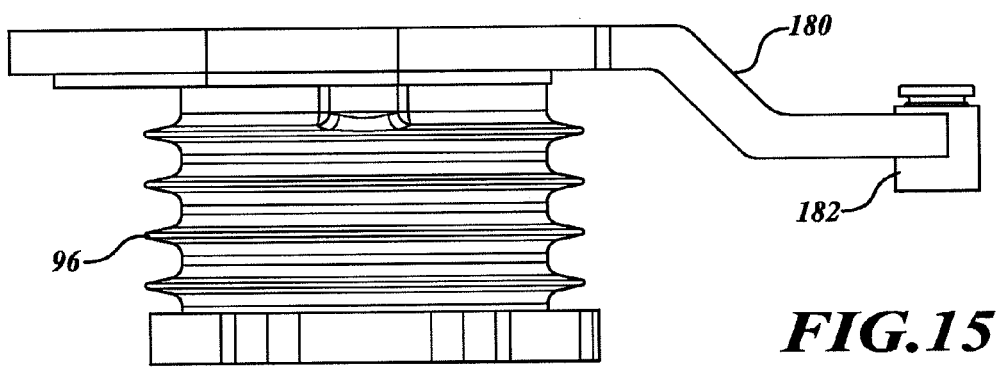
FIG. 15 is a schematic illustration in plan view of the motor housing portion.

FIGS. 13-15 show the motor housing 96 with a mounting flange 180 with an opening 182 by which the motor housing 96 can be mounted to the engine 13 of FIG. 1. The mounting flange 180 extends in the same direction as the flange 154 of the gear cover portion 95. A seal 185 is positioned in an opening 186 of the motor housing 96 at which the motor shaft 52 is splined to the first gear member 53, as shown in FIG. 4. A needle bearing 188 is positioned in another opening 190 in the motor housing portion 96 at which the second gear member 54 is supported for rotation. The rotor housing 90 can be fastened to the motor housing portion 96 around the opening 140 with fasteners that extend through stepped openings 192. FIG. 14 shows that the motor housing portion 96 has openings 193 around a flange at which the motor controller housing 194 of FIG. 4 is mounted by fasteners extending through the openings 193. The motor housing portion 96 includes integral cooling fins 196 for cooling the motor-generator 50.

Figure 16:
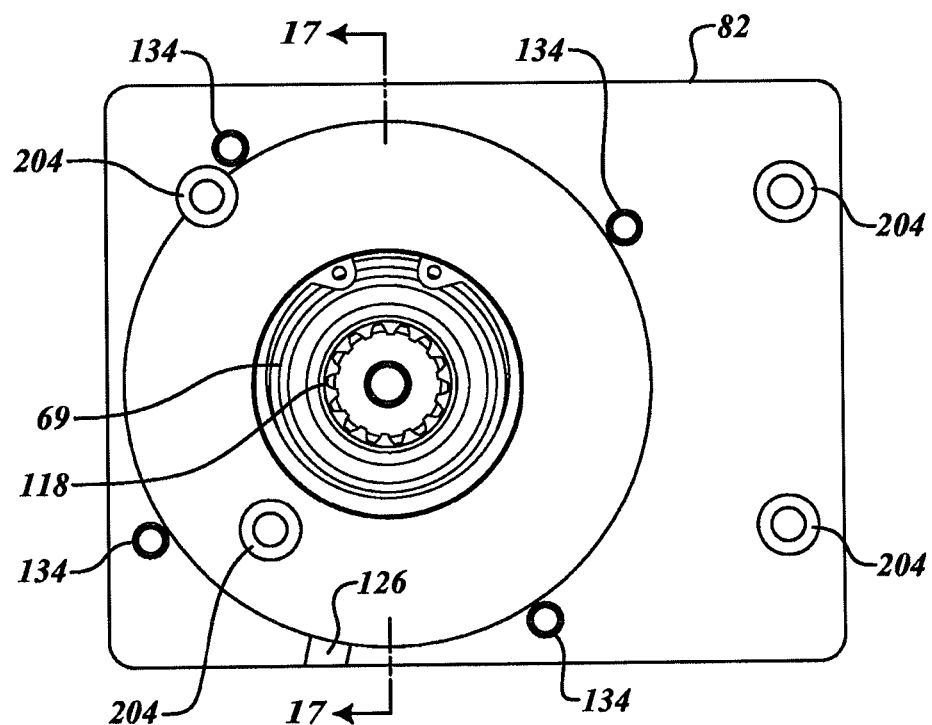
FIG. 16 is a schematic illustration in end view of an inlet cover portion of the housing forming a cavity for a brake.
Figure 17:
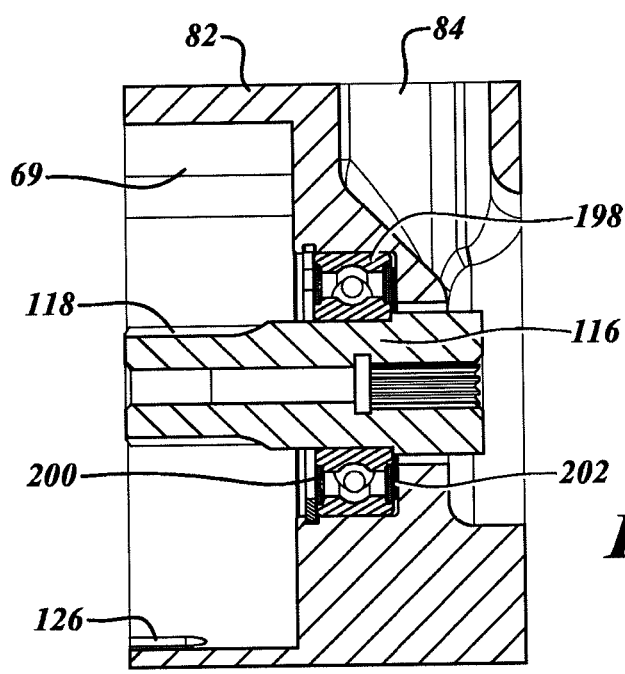
FIG. 17 is a schematic illustration in cross-sectional view of the inlet cover portion taken at the lines 17-17 in FIG. 16.
Figure 18:
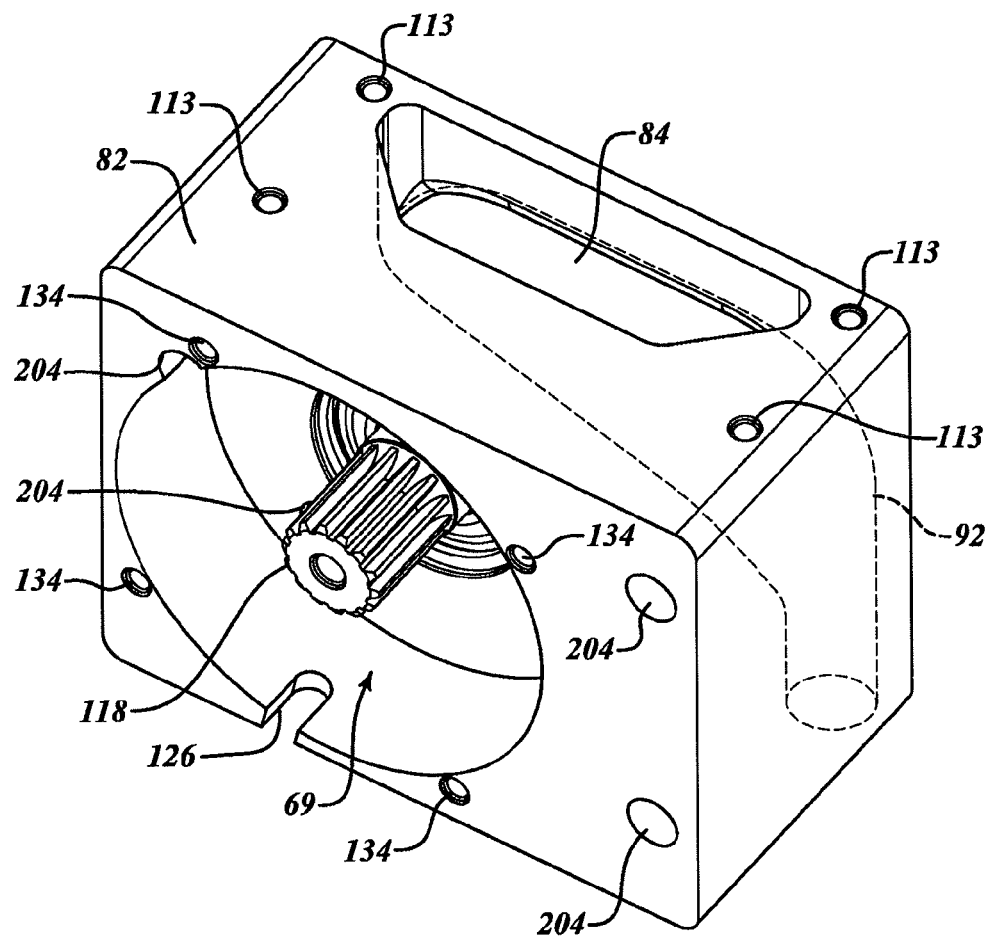
FIG. 18 is a schematic perspective illustration of the inlet cover portion.

FIGS. 16-18 show the inlet cover portion 82 with the toothed end portion 118 of the extension 116 extending into the cavity 69. FIG. 17 shows a bearing 198 supporting the end portion 116 for rotation relative to the inlet cover portion 82. A snap ring 200 holds the bearing in a bore in the inlet cover portion 82. A wave disc spring 202 absorbs axial thrust forces between the bearing 198 and the inlet cover portion 82 keeping the outer race of bearing 198 from spinning in the bore. Stepped openings 204 extend through the inlet cover portion 82 to allow the inlet cover portion 82 to be mounted to the rotor housing portion 90 with fasteners (not shown).

Figure 23:
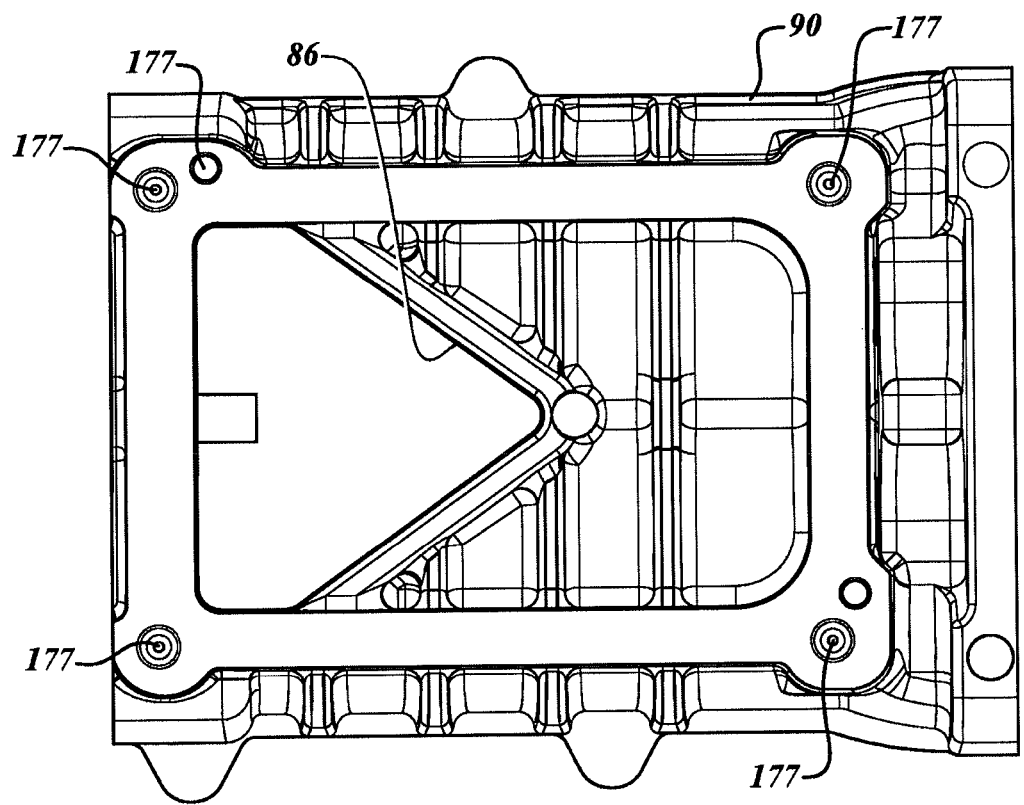
FIG. 23 is a schematic illustration in bottom view of the rotor housing of FIG. 2.
Figure 24:
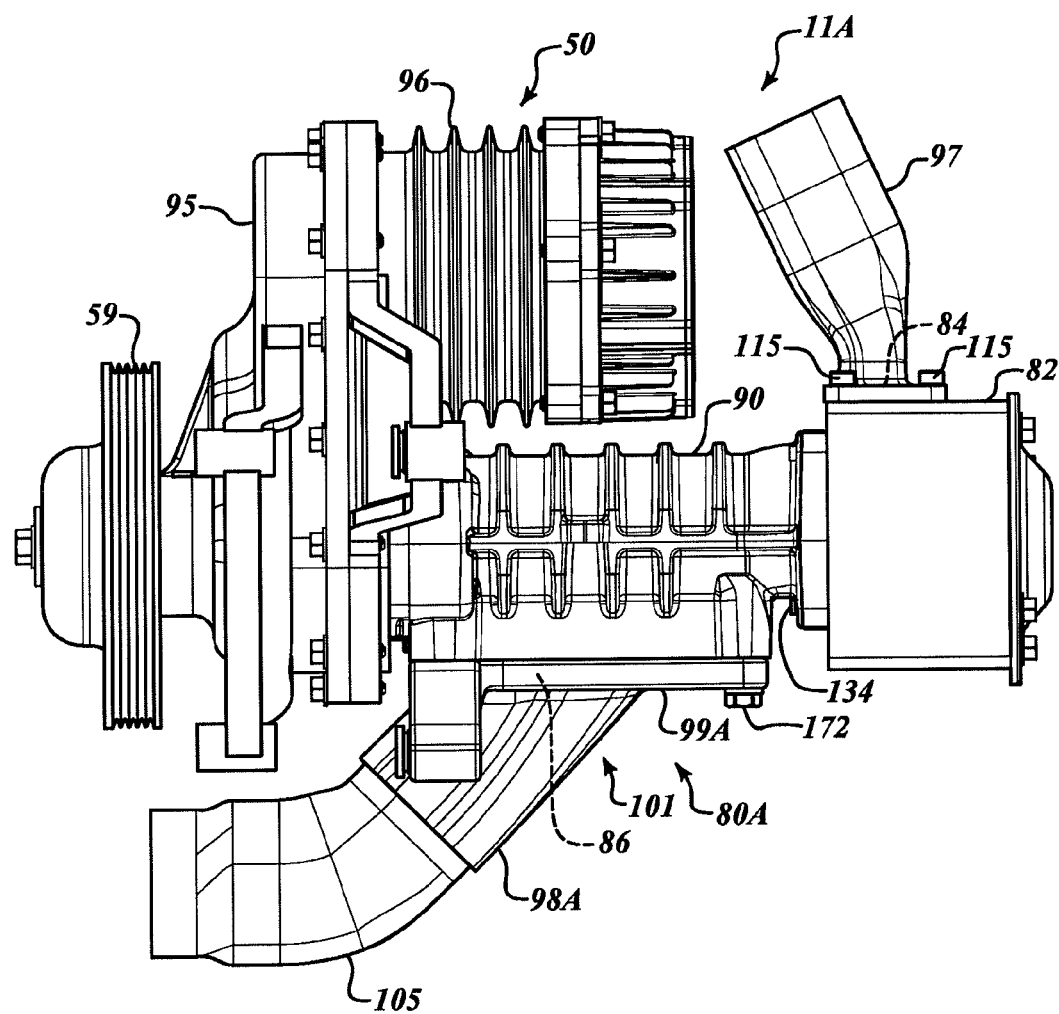
FIG. 24 is a schematic illustration in side view of a supercharger assembly having the outlet component of FIGS. 21 and 22.

FIGS. 21 and 22 show a unitary, one-piece outlet component 101 that includes an outlet housing 99A and an outlet pipe 98A. The outlet component 101 can be used in lieu of the outlet housing 99 and outlet pipe 98, as shown in the supercharger assembly 11A of FIG. 24, which is otherwise identical to supercharger assembly 11. An extension pipe 105 can be welded to the outlet pipe 98A to connect to the throttle body 16. The outlet housing 99A has an opening 103A that is generally shaped like a pentagon. The opening 103A has a tapered, V-shaped end, opposite a wider end. FIG. 23 shows that the air outlet 86 of the rotor housing portion 90 is also generally shaped like a pentagon and is generally the same shape as the opening 103A. The outlet pipe 98A extends from the outlet housing 99A at a 45 degree angle. The generally pentagon shape of the opening 103A as well as the angle at which the outlet pipe extends from the outlet housing 99A provide beneficial air flow characteristics. FIG. 24 shows the supercharger assembly 11A like the supercharger assembly 11 of FIG. 2 except with a housing assembly 80A that includes the outlet component 101 in place of the outlet housing 99 and the outlet pipe 98.

As is apparent in FIGS. 1 and 2, the housing assembly 80 is configured so that the electric motor-generator 50 and the rotor housing portion 90 are on an opposite side of the gear cover portion 95 than the pulley 59. Additionally, the air inlet passage 85 and inlet pipe 97 are adjacent to the electric motor-generator 50 and the air outlet passage 88 and outlet pipe 98 are on an opposite side of the rotor housing portion 90 than the electric motor-generator 50. The housing assembly 80A is arranged in a like manner. It should be appreciated that the throttle body 16 and throttle 14 may be positioned upstream of the inlet pipe 97 in air flow to the engine 13, in which case the supercharger 12 would pull air through the throttle 14 and would be operable to allow the same operating modes discussed herein.

The reference numbers used in the drawings and the specification along with the corresponding components are as follows:

10 engine assembly
11 supercharger assembly
11A supercharger assembly
12 supercharger
13 engine
14 throttle
14A fully open position of throttle
16 throttle body
18 plenum
20 intake manifold
21 drive axle
22 transmission
24 set of rotors
26 first rotor
28 second rotor
30 first shaft
31 first set of plates
32 second shaft
33 second set of plates
34 first gear
35 clutch housing
36 second gear
37 spring
38 apply plate
39 coil
41 planetary gearing arrangement
42 sun gear member
44 ring gear member
46 carrier member
47 pinion gears
48 crankshaft
49 belt drive
50 electric motor-generator
52 motor shaft
53 first gear member
54 second gear member
55 clutch
56 shaft
57 pulley
58 semi-flexible coupling member
59 pulley
61 pulley shaft
62 motor controller
63 belt
64 energy storage device
65 system controller
66 power cables
68 brake
69 cavity
70 bypass valve
70A fully open position of bypass valve
76 pulley
79 shaft
78 vehicle accessories
80 stationary housing assembly
80A stationary housing assembly
82 inlet cover portion
84 air inlet of inlet cover portion
84A air inlet opening of rotor housing portion
85 air inlet passage
86 air outlet
88 air outlet passage 90 rotor housing portion
92 portion of bypass passage
94 bypass passage
95 gear cover portion
96 motor housing portion
97 inlet pipe
98 outlet pipe
98A outlet pipe
99 outlet housing
99A outlet housing
100 oil slinger
101 outlet component
102 first end of oil slinger
103 opening of outlet housing 99
103A opening of outlet housing 99A
104 first inner diameter
105 extension pipe
106 second end of oil slinger
108 scooped portion
110 opening
112 inner surface of scooped portions
113 opening of inlet cover portion
114 inner surface of oil slinger
115 fastener
116 extension portion of first shaft
118 toothed end portion
120 rotating member
122 flange
124 bearing
126 wire access opening
128 coil
130 brake cover
132 fastener
134 opening
135 fastener
140 opening of motor housing portion
142 first member of coupling
144 flange of shaft 56
146 pin
148 seal on first shaft
150 fastener openings on gear cover portion
151 opening
152 fastener opening in motor housing portion.
154 mounting flange
156 fastener opening
157 fasteners
158 hex screw
160A bearing
160B bearing
161 washer
162 passage
164 seal
166A wave disc spring
166B wave disc spring
166C disc spring
166D disc spring
167A ribs
167B ribs
167C ribs
168A needle bearing
168B needle bearing
169 recess
170 fastener opening
172 fastener
173 flange
174 opening
176 outlet of outlet pipe
177 fastener opening
180 mounting flange
182 opening
185 seal
186 opening
188 needle bearing
190 opening
192 stepped opening
193 opening
194 motor controller housing
196 cooling fins
198 bearing
200 snap ring
202 wave disc spring
204 stepped openings
A direction of oil While the best modes for carrying out the many aspects of the present teachings have been described in detail, those familiar with the art to which these teachings relate will recognize various alternative aspects for practicing the present teachings that are within the scope of the appended claims.

What is claimed is:

1. A supercharger assembly for an engine having a crankshaft and an air intake manifold defining a plenum through which air flow is provided to the engine, the supercharger assembly comprising:
    a supercharger upstream of the plenum in the air flow to the engine, wherein the supercharger has a first rotor mounted on and rotatable with a first shaft and a second rotor meshing with the first rotor and mounted on and rotatable with a second shaft via rotation of the first shaft;
    an electric motor-generator selectively operable as a motor and as a generator;
    a planetary gearing arrangement having a first member operatively connected to be rotated by the electric motor-generator, a second member connectable to be rotated by the engine crankshaft, and a third member operatively connected for rotation with the first shaft;
    two selectively engageable torque-transmitting mechanisms including a clutch selectively engageable to operatively connect the second member for rotation with the engine crankshaft, and a brake selectively engageable to hold the first shaft stationary; and
    a control system configured to control the electric motor-generator, the brake and the clutch to achieve different operating modes;
    wherein the control system is configured to engage the brake and control the electric motor-generator to function as the generator with torque applied to the electric motor-generator in a reverse direction than a direction of torque supplied by the electric motor-generator when the electric motor-generator functions as a motor, thereby applying reverse torque to the crankshaft and storing electric energy generated by the electric motor-generator in an energy storage device.

2. The supercharger assembly of claim 1, wherein at least one vehicle accessory is operatively connected to the second member; and wherein the control system is configured to disengage the clutch when the engine is off, and control the electric motor-generator to function as a motor to power said at least one vehicle accessory in an engine-off operating mode.

3. The supercharger assembly of claim 1, wherein the control system is configured to engage both the brake and the clutch and control the electric motor-generator to function as a motor to start the engine through the planetary gearing arrangement in an engine-start operating mode.

4. The supercharger assembly of claim 1, wherein the control system is configured to engage only the clutch when the engine is on and control the electric motor-generator to function as a motor, both engine torque and electric motor-generator torque thus driving the supercharger in an engine boost operating mode.

5. The supercharger assembly of claim 4, wherein the control system is configured to vary a speed of the electric motor-generator to control engine boost provided by the supercharger based on engine torque demand during the engine boost operating mode.

6. The supercharger assembly of claim 4, wherein the supercharger assembly further comprises:
   a bypass passage configured to permit air to flow from an inlet of the supercharger to the
     plenum, bypassing the first and second rotors; and
   a bypass valve operable to control airflow through the bypass passage;
   wherein the control system is configured to control a position of the bypass valve during
     the engine boost operating mode to adjust a pressure of air in the plenum as engine torque demand varies.

7. The supercharger assembly of claim 1, wherein the engine has a throttle body and a throttle valve in the throttle body; wherein the plenum is downstream of the throttle body in air flow to the engine; wherein the supercharger is in series with the throttle valve in air flow to the engine and further comprising:
   an energy storage device operatively connected to the electric motor-generator for
     supplying electric power to the electric motor-generator when the electric motor-generator functions as a motor and for receiving electric power from the electric motor-generator when the electric motor-generator functions as the generator;
   wherein the control system is configured to control the electric motor-generator to
     function as the generator, and to move the throttle valve to a relatively open position so that torque due to a throttling pressure drop across the supercharger is provided from the supercharger to the electric motor-generator through the planetary gearing arrangement, throttling losses thus being captured as electric energy in the energy storage device.

8. The supercharger assembly of claim 7, wherein the control system is configured to alternately control the electric motor-generator to function as a motor, engage the brake, open a bypass valve, and position the throttle valve to a relatively closed position managing the throttling pressure drop, when a state of charge of the energy storage device reaches a predetermined maximum so that the motor-generator drives the crankshaft until the state of charge of the energy storage device reaches a predetermined minimum, and then control the electric motor-generator to function as the generator, move the throttle valve to the relatively open position so that torque due to the throttling pressure drop across the supercharger is provided from the supercharger to the electric motor-generator through the planetary gearing arrangement.

9. The supercharger assembly of claim 1, further comprising:
   a housing assembly having:
     a rotor housing portion configured to radially surround the first and second rotors; and
     an inlet cover portion configured to attach to the rotor housing portion such that the first
       shaft extends from within the rotor housing portion into the inlet cover portion and is supported by the inlet cover portion; wherein the inlet cover portion at least partially defines an air inlet passage through which air is provided to the rotors; and wherein the inlet cover portion further defines a cavity and supports the brake within the cavity.

10. The supercharger assembly of claim 9, wherein the inlet cover portion partially defines a bypass passage configured to divert air from the air inlet passage to a throttle body, bypassing the rotors; and
   a bypass valve positioned in the bypass passage and operable to control airflow through the bypass passage.

11. The supercharger assembly of claim 1, further comprising:
   a coupling member operatively connecting the third member with the first shaft;
   a housing assembly having:
     a rotor housing portion configured to radially surround the first and second rotors;
     a motor housing portion that has an opening aligned with an end of the rotor housing portion; and
     a gear cover portion that mounts to the motor housing portion such that the first shaft extends from within the rotor housing portion to the coupling member at the opening in the motor housing portion; and wherein the gear cover portion is configured to house the planetary gearing arrangement.

12. The supercharger assembly of claim 11, wherein the motor housing portion is configured to be attached to the electric motor-generator; and further comprising a gear train positioned within the gear cover portion and having a first gear member connected for rotation with the electric motor-generator and a second gear member connected for rotation with the first member of the planetary gearing arrangement, the gear train thereby transferring torque between the planetary gearing arrangement and the electric motor-generator.

13. The supercharger assembly of claim 11, further comprising:
   a pulley having a pulley shaft supported by the gear cover portion; wherein the pulley shaft is connected for rotation with the second member; wherein the pulley is operatively connected to the crankshaft; and
   an oil slinger mounted to the pulley shaft and opening toward the planetary gearing arrangement and configured to direct fluid within the gear cover portion onto the planetary gearing arrangement.

14. The supercharger assembly of claim 1, further comprising:
   a gear cover portion configured to house the planetary gearing arrangement;
   a pulley having a pulley shaft; and
   bearings supporting the pulley shaft for rotation relative to the gear cover portion;
     wherein the pulley shaft is connected for rotation with the second member;
     wherein the pulley is operatively connectable to the crankshaft;
   wherein the gear cover portion has integral ribs and a passage; wherein the ribs are positioned to collect lubricating oil and direct the lubricating oil to the bearings through the passage.

15. The supercharger assembly of claim 1, further comprising:

a rotor housing portion configured to radially surround the first and second rotors and at least partially defining an air inlet and an air outlet; and
an outlet component including an outlet opening; wherein the outlet component is configured to attach to the rotor housing portion with the outlet opening in fluid communication with the air outlet; and wherein the air outlet and the outlet opening both have an identical pentagon shape.

16. A supercharger assembly for an engine having a crankshaft and an air intake manifold defining a plenum through which air flow is provided to the engine, the supercharger assembly comprising:
a supercharger upstream of the plenum in the air flow to the engine, wherein the
supercharger has a first rotor mounted on and rotatable with a first shaft and a
second rotor meshing with the first rotor and mounted on and rotatable with a
second shaft via rotation of the first shaft;
an electric motor-generator selectively operable as a motor and as a generator;
a planetary gearing arrangement having a first member operatively connected to be
rotated by the electric motor-generator, a second member connectable to be
rotated by the engine crankshaft, and a third member operatively connected for
rotation with the first shaft;
a housing assembly having:
a rotor housing portion configured to radially surround the first and second rotors; and
an inlet cover portion configured to attach to the rotor housing portion such that the first shaft extends from within the rotor housing portion into the inlet cover portion and is supported by the inlet cover portion; wherein the inlet cover portion at least partially defines an air inlet passage through which air is provided to the rotors; and wherein the inlet cover portion further defines a cavity and supports the brake within the cavity; two selectively engageable torque-transmitting mechanisms including a clutch selectively engageable to operatively connect the second member for rotation with the engine crankshaft, and a brake selectively engageable to hold the first shaft stationary; and
a control system configured to control the electric motor-generator, the brake and the clutch to achieve different operating modes.

17. The supercharger assembly of claim 16, wherein the inlet cover portion partially defines a bypass passage configured to divert air from the air inlet passage to a throttle body, bypassing the rotors; and
a bypass valve positioned in the bypass passage and operable to control airflow through the bypass passage.

18. A supercharger assembly for an engine defining a plenum through which air flows to the engine; the supercharger assembly comprising:
a supercharger in series with the plenum in the air flow to the engine, wherein the supercharger has a first rotor mounted on and rotatable with a first shaft and a second rotor meshing with the first rotor and mounted on and rotatable with a second shaft via rotation of the first shaft;
a bypass passage operatively connecting an air inlet to a throttle body;
a bypass valve positioned in the bypass passage to selectively permit air flow through the bypass passage between the air inlet and the throttle body and bypassing the first and second rotors;
an electric motor-generator selectively alternately operable as a motor and as a generator;
an energy storage device operatively connected to the electric motor-generator for supplying electric power to the electric motor-generator when the electric motor-generator functions as a motor and for receiving electric power from the electric motor-generator when the electric motor-generator functions as the generator;
a planetary gearing arrangement having a first member operatively connected to be rotated by the electric motor-generator, a second member, and a third member operatively connected for rotation with the first shaft;
a pulley configured to be operatively connectable to a crankshaft and having a pulley shaft connected for rotation with the second member;
a gear train having a first gear member connected for rotation with the electric motor-generator and a second gear member connected for rotation with the third member of the planetary gearing arrangement, the gear train thereby transferring torque between the planetary gearing arrangement and the electric motor-generator;
two selectively engageable torque-transmitting mechanisms including an electromagnetic clutch selectively engageable to operatively connect the second member for rotation with the engine crankshaft, and an electromagnetic brake selectively engageable to hold the first shaft stationary; and
a control system configured to control the electric motor-generator, the bypass valve, the brake and the clutch to achieve different operating modes.

19. The supercharger assembly of claim 18, further comprising:
a housing assembly having:
a rotor housing portion configured to radially surround the first and second rotors and having a rotor housing air inlet opening and a rotor housing air outlet at least partially defining an air outlet passage;
an inlet cover portion configured to attach to the rotor housing portion such that the first shaft extends into and is supported by the inlet cover portion; wherein the inlet cover portion at least partially defines an air inlet passage through which air is provided to the rotor housing air inlet opening;
a motor housing portion that has an opening aligned with the first and second shafts in the rotor housing portion; wherein the motor housing portion is configured to support the electric motor-generator; and
a gear cover portion that mounts to the motor housing portion with a coupling member positioned at the opening of the motor housing portion such that the first shaft operatively connects to the third member via the coupling member; wherein the gear cover portion is configured to house the planetary gearing arrangement and support the pulley and the pulley shaft;
wherein the housing assembly is configured so that the electric motor-generator and the rotor housing portion are on an opposite side of the gear cover portion than the pulley, the air inlet passage is adjacent to the electric motor-generator and the air outlet passage is on an opposite side of the rotor housing portion than the electric motor-generator.

20. A supercharger assembly for an engine having a crankshaft, a throttle body, an air intake manifold defining a plenum downstream of the throttle body, and a selectively positionable throttle valve in the throttle body controlling air flow to the engine; the supercharger assembly comprising:

a Roots-type supercharger in series with the throttle valve upstream of the throttle body in the air flow to the engine; wherein the supercharger has a first rotor mounted on and rotatable with a first shaft and a second rotor meshing with the first rotor and mounted on and rotatable with a second shaft via rotation of the first shaft;

a housing assembly defining an air inlet to the supercharger;

a bypass passage operatively connecting the air inlet to the throttle body;

a bypass valve positioned in the bypass passage to selectively permit air flow through the bypass passage between the air inlet and the throttle body and bypassing the first and second rotors;

an electric motor-generator selectively alternately operable as a motor and as a generator;

an energy storage device operatively connected to the electric motor-generator for supplying electric power to the electric motor-generator when the electric motor-generator functions as a motor and for receiving electric power from the electric motor-generator when the electric motor-generator functions as the generator;

a planetary gearing arrangement having a first member connected to be rotated by the electric motor-generator, a second member connectable to be rotated by the engine crankshaft, and a third member connected for rotation with the first shaft;

two selectively engageable torque-transmitting mechanisms consisting of a clutch selectively engageable to operatively connect the second member for rotation with the engine crankshaft, and a brake selectively engageable to hold the first shaft stationary; and a control system configured to control the electric motor-generator, the throttle valve, the bypass valve, the brake and the clutch to achieve an operating mode in which the electric motor-generator starts the engine, an operating mode in which the engine is on and the electric motor-generator varies a speed of the rotors via the planetary gearing arrangement to control air pressure in the plenum, and an operating mode in which air flows to the engine bypasses the rotors through the bypass passage.

21. The supercharger assembly of claim 20, wherein the control system is configured to control the electric motor-generator to function as the generator and the throttle valve is controlled to move to a relatively open position so that torque due to a throttling pressure drop across the supercharger is provided from the supercharger to the electric motor-generator through the planetary gearing arrangement, throttling losses thus being captured as electric energy, and wherein the control system is configured to control the electric motor-generator to function as the generator and the throttle valve is controlled to move to a relatively open position so that the pressure drop across the supercharger is equal to or greater than the original throttle pressure drop such that the electric motor-generator, through the planetary gearing arrangement, captures the throttling as electric energy.

* * * * *